US012138801B2

United States Patent
Yamauchi et al.

(10) Patent No.: US 12,138,801 B2
(45) Date of Patent: Nov. 12, 2024

(54) TRAJECTORY PLAN GENERATION DEVICE, TRAJECTORY PLAN GENERATION METHOD, AND TRAJECTORY PLAN GENERATION PROGRAM

(71) Applicant: Hitachi, Ltd., Tokyo (JP)

(72) Inventors: Yuta Yamauchi, Tokyo (JP); Nobuaki Nakasu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 296 days.

(21) Appl. No.: 17/772,524

(22) PCT Filed: Aug. 13, 2020

(86) PCT No.: PCT/JP2020/030810
§ 371 (c)(1),
(2) Date: Apr. 28, 2022

(87) PCT Pub. No.: WO2021/100268
PCT Pub. Date: May 27, 2021

(65) Prior Publication Data
US 2022/0379473 A1 Dec. 1, 2022

(30) Foreign Application Priority Data
Nov. 19, 2019 (JP) .................................. 2019-208578

(51) Int. Cl.
*B25J 9/16* (2006.01)
*G05D 3/10* (2006.01)

(52) U.S. Cl.
CPC .............. *B25J 9/1664* (2013.01); *G05D 3/10* (2013.01)

(58) Field of Classification Search
CPC ...... B25J 9/1664; B25J 9/1656; B25J 9/1628; B25J 9/1651; B25J 9/163; B25J 9/1666;
(Continued)

(56) References Cited

U.S. PATENT DOCUMENTS 8,204,623 B1    6/2012 Bhattacharyya et al.
9,981,381 B1 *  5/2018 Nagarajan .............. B25J 9/1664
(Continued)

FOREIGN PATENT DOCUMENTS

JP    2005-309990 A    11/2005
JP    2006-068890 A     3/2006
(Continued)

OTHER PUBLICATIONS

International Search Report of PCT/JP2020/030810 dated Nov. 17, 2020.

Primary Examiner — Abby Y Lin
Assistant Examiner — Esvinder Singh
(74) Attorney, Agent, or Firm — MATTINGLY & MALUR, PC

(57) ABSTRACT

A trajectory plan generation device executes a first search process for searching for a plurality of position candidates which are movement destinations of the tip portion within a predetermined distance from first trajectory information indicating positions and postures of the tip portion between the start point and the end point, a second search process for searching for a plurality of posture candidates of the tip portion that change within an allowable range by spherical interpolation based on postures of the tip portion at the start point and the end point, a determination process for determining second trajectory information indicating positions and postures of movement destinations of the tip portion from the first trajectory information based on the plurality of position candidates searched for by the first search process and the plurality of posture candidates searched for by the second search process, and an output process.

15 Claims, 20 Drawing Sheets

(58) Field of Classification Search
CPC ......... B25J 9/1674; B25J 9/1676; G05D 3/10; G05B 2219/39091; G05B 2219/40455; G05B 19/4093; G05B 19/42; G05B 19/41
See application file for complete search history.

(56) References Cited

U.S. PATENT DOCUMENTS

| | | | |
|---|---|---|---|
| 2019/0009412 A1* | 1/2019 | Khan | B25J 9/1666 |
| 2019/0039242 A1* | 2/2019 | Fujii | B25J 9/1666 |
| 2019/0240833 A1* | 8/2019 | Kimura | B25J 9/1664 |
| 2019/0275675 A1 | 9/2019 | Seno et al. | |
| 2021/0138646 A1* | 5/2021 | Matsushima | B25J 9/1664 |
| 2022/0281110 A1* | 9/2022 | Vanheerden | B25J 9/1666 |

FOREIGN PATENT DOCUMENTS

| | | |
|---|---|---|
| JP | 2012-040635 A | 3/2012 |
| JP | 2012-187697 A | 10/2012 |
| JP | 2013-246553 A | 12/2013 |
| JP | 2017-213631 A | 12/2017 |
| JP | 2019-135076 A | 8/2019 |
| JP | 2019-155501 A | 9/2019 |

\* cited by examiner

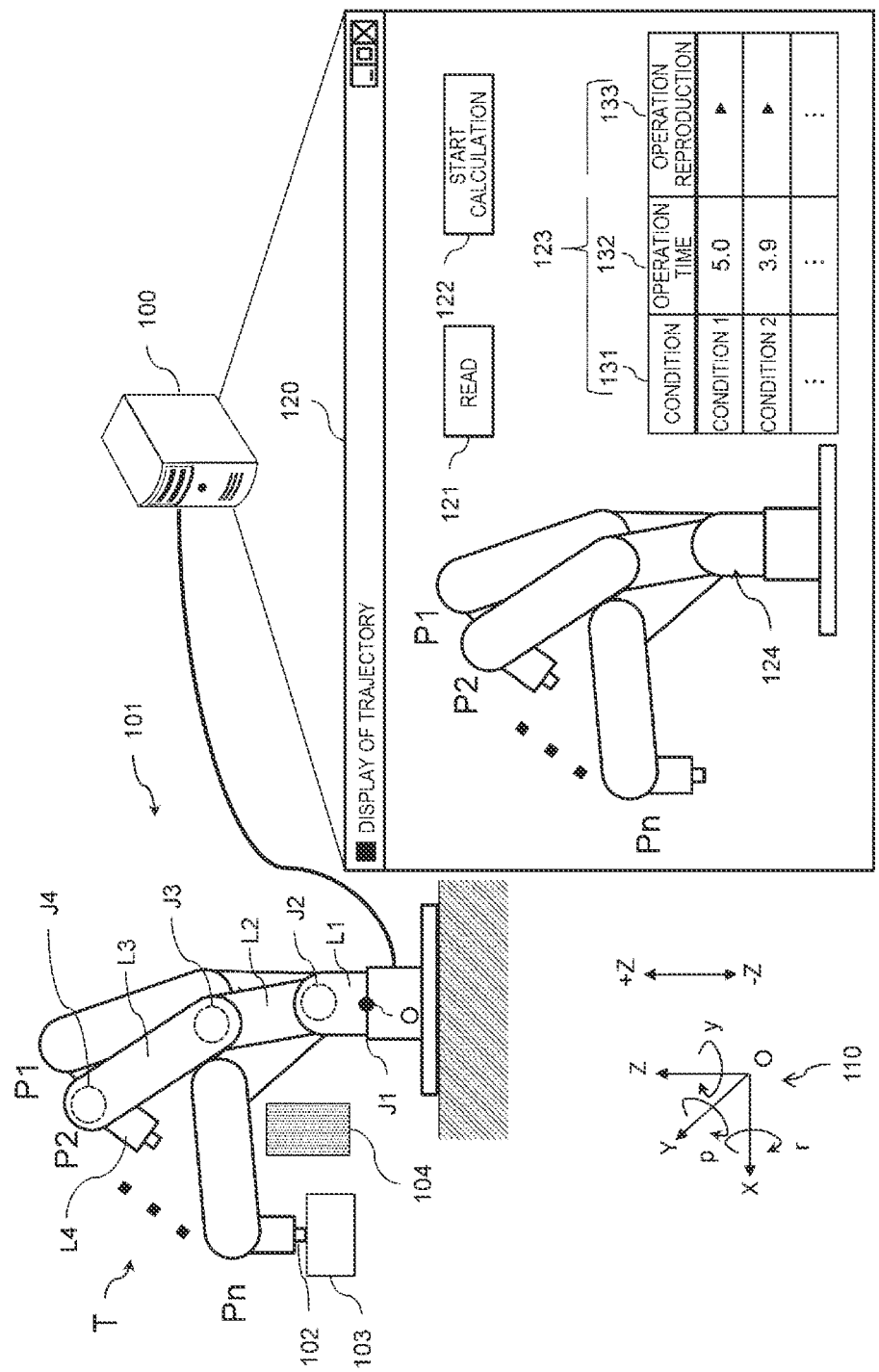
[FIG. 1]

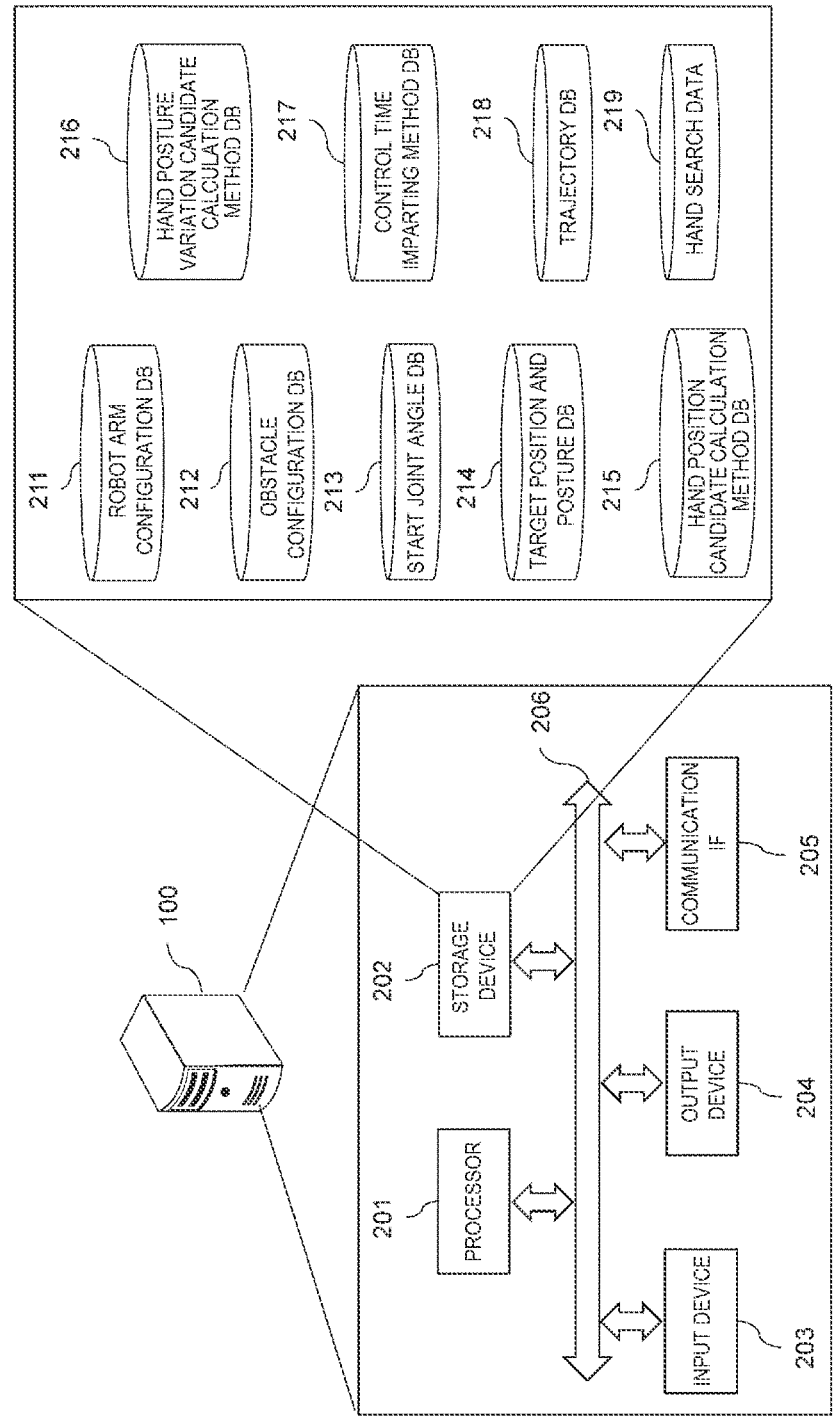
[FIG. 2]

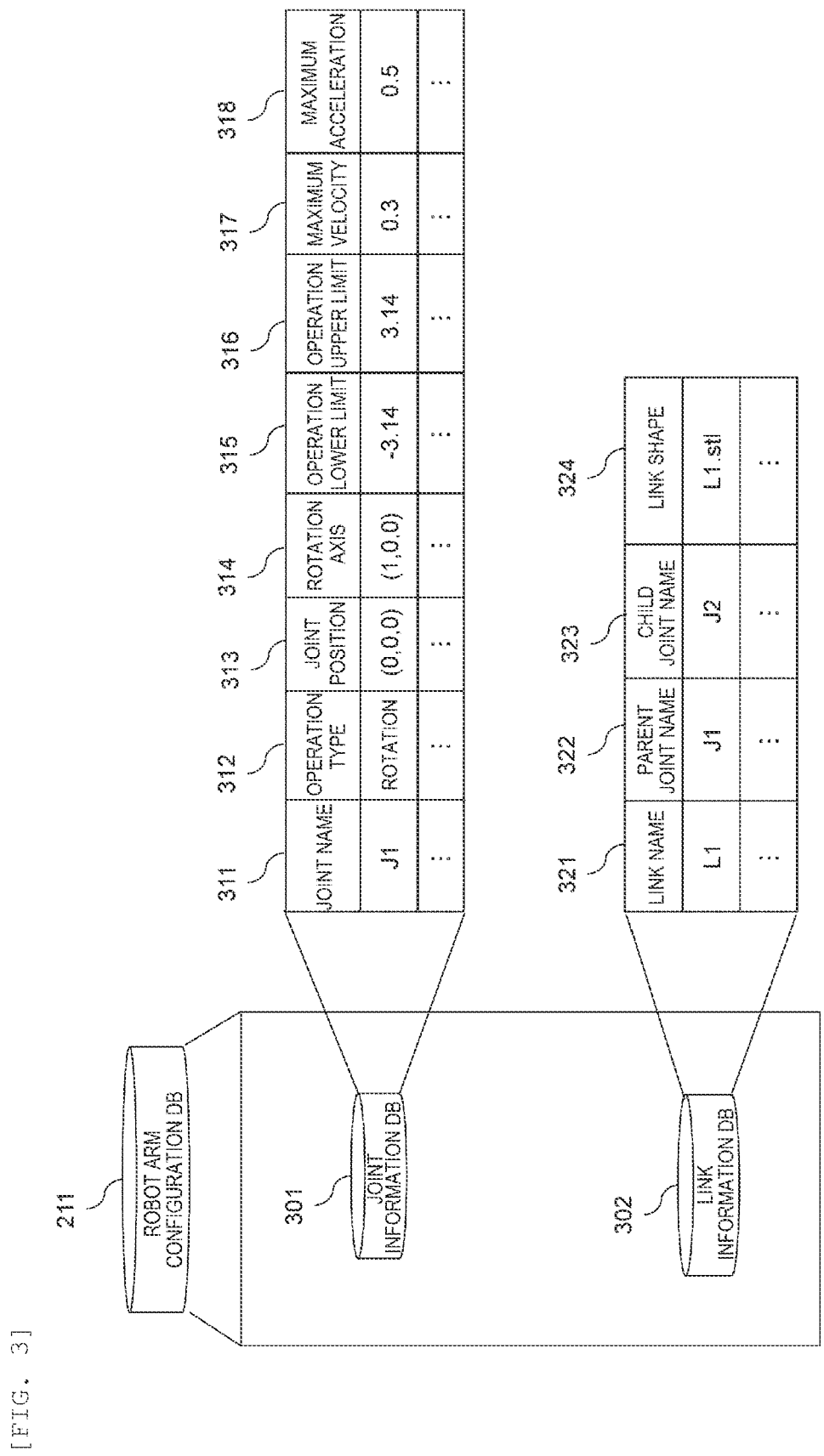
[FIG. 3]

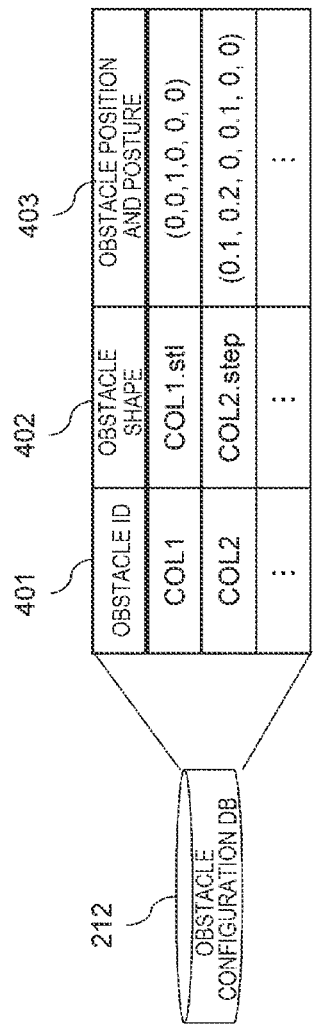
[FIG. 4]

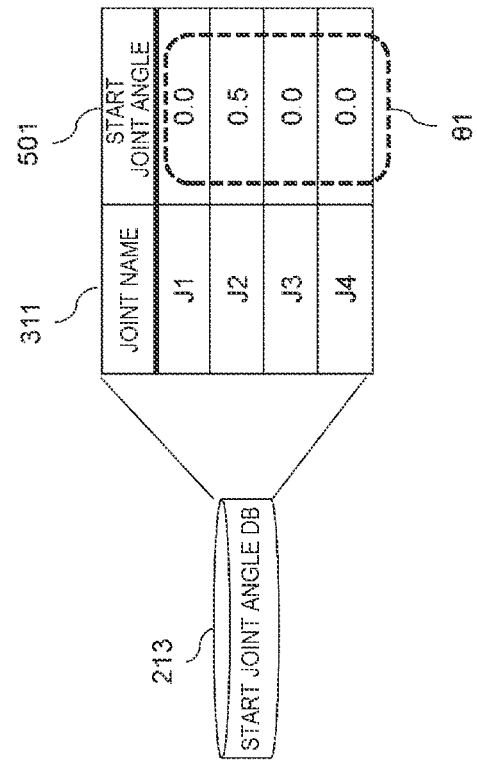
[FIG. 5]

[FIG. 6]
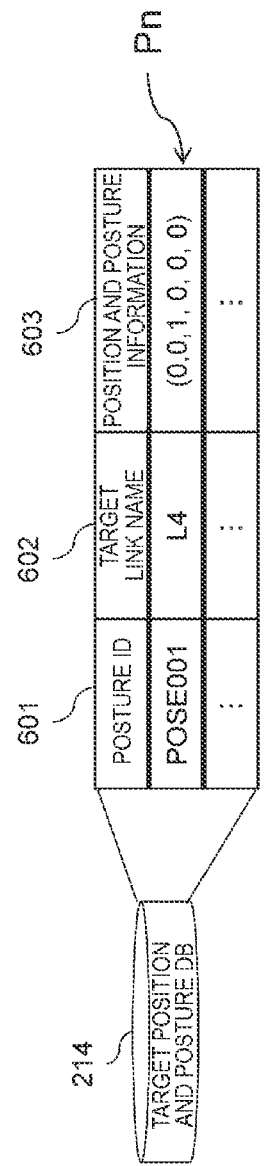

[FIG. 7]
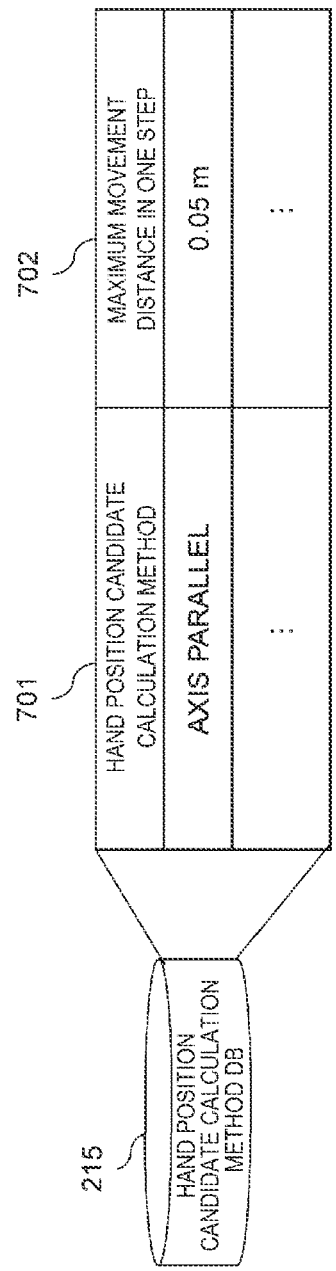

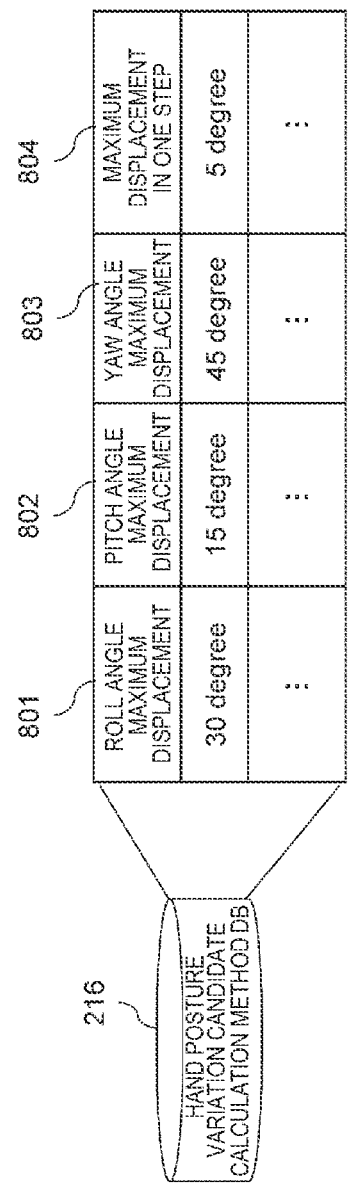
[FIG. 8]

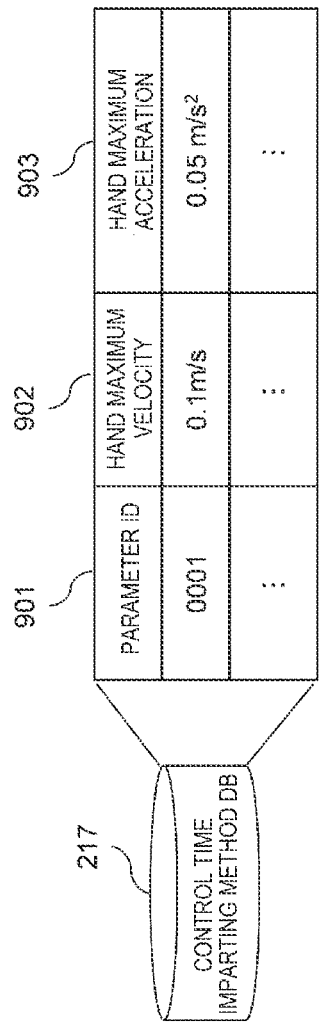
[FIG. 9]

[FIG. 10]
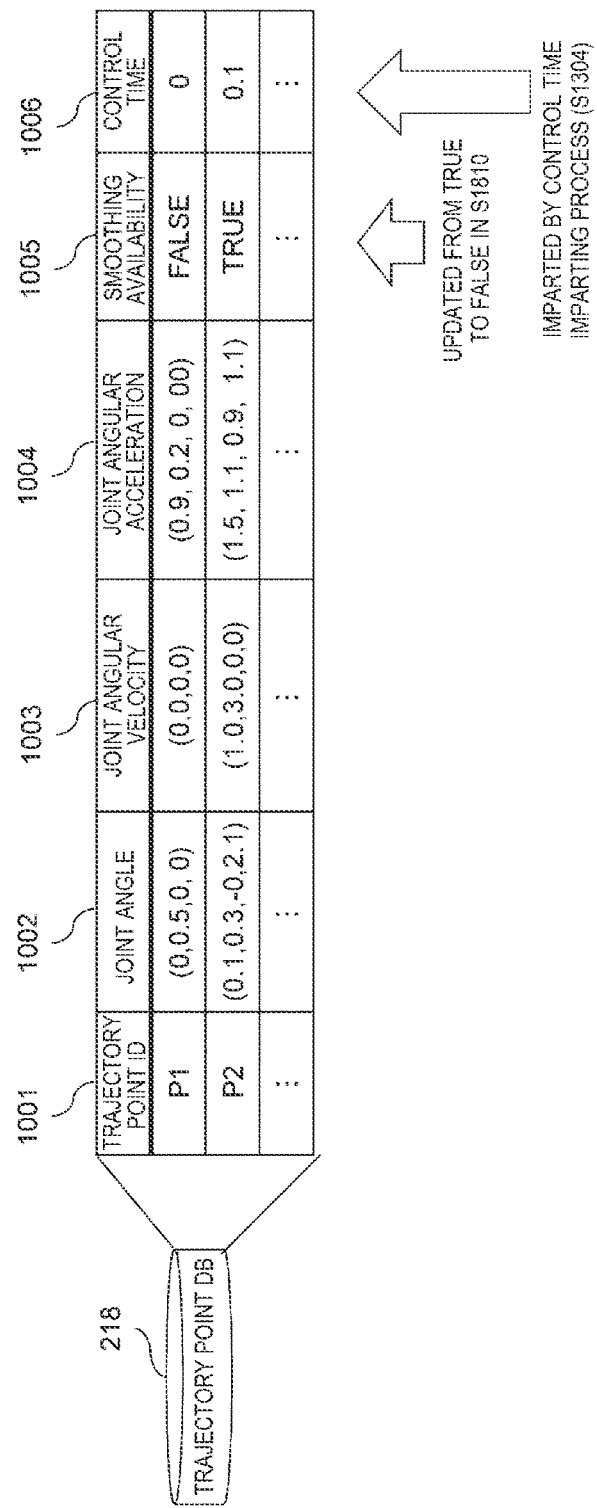

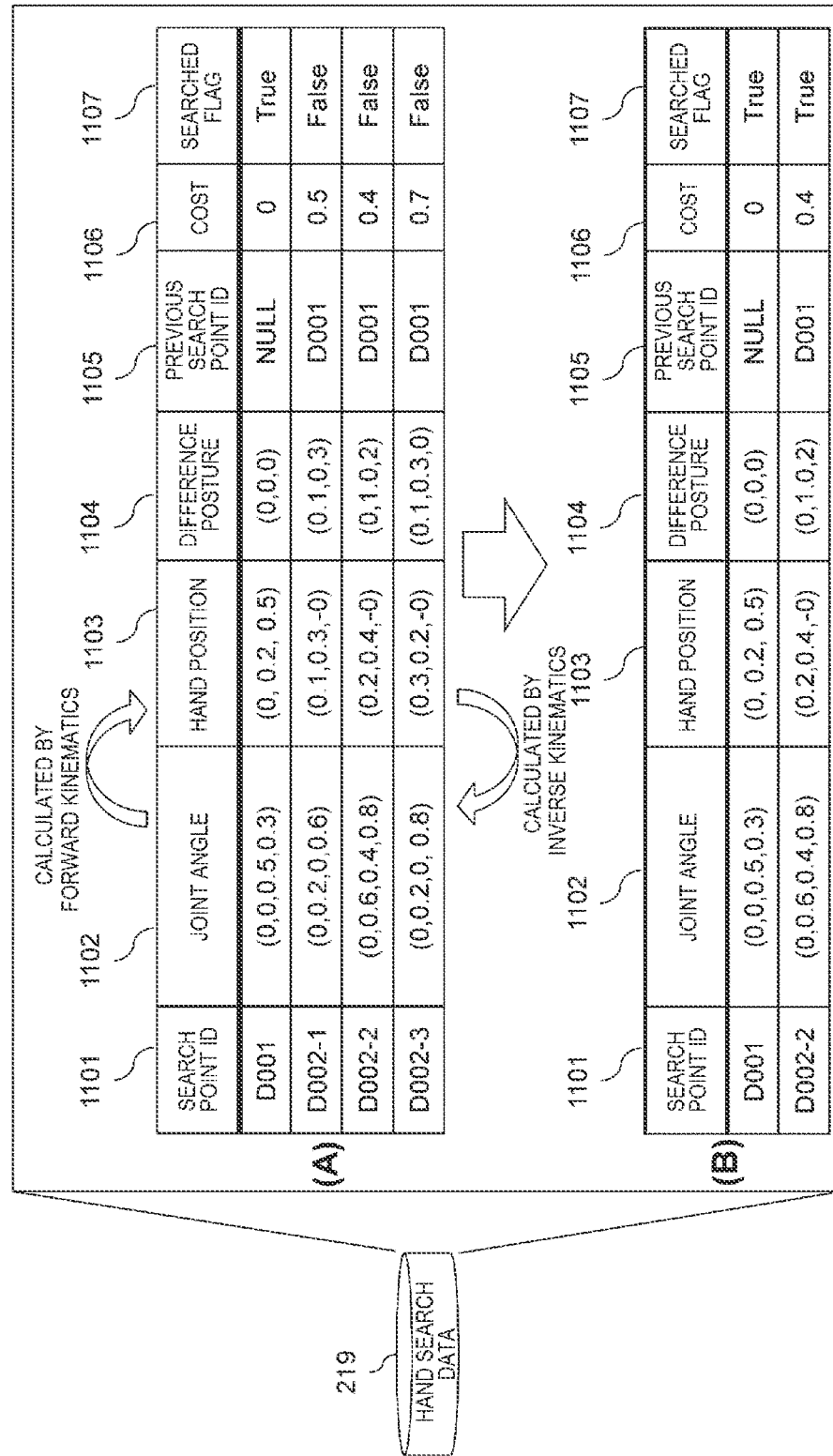
[FIG. 11]

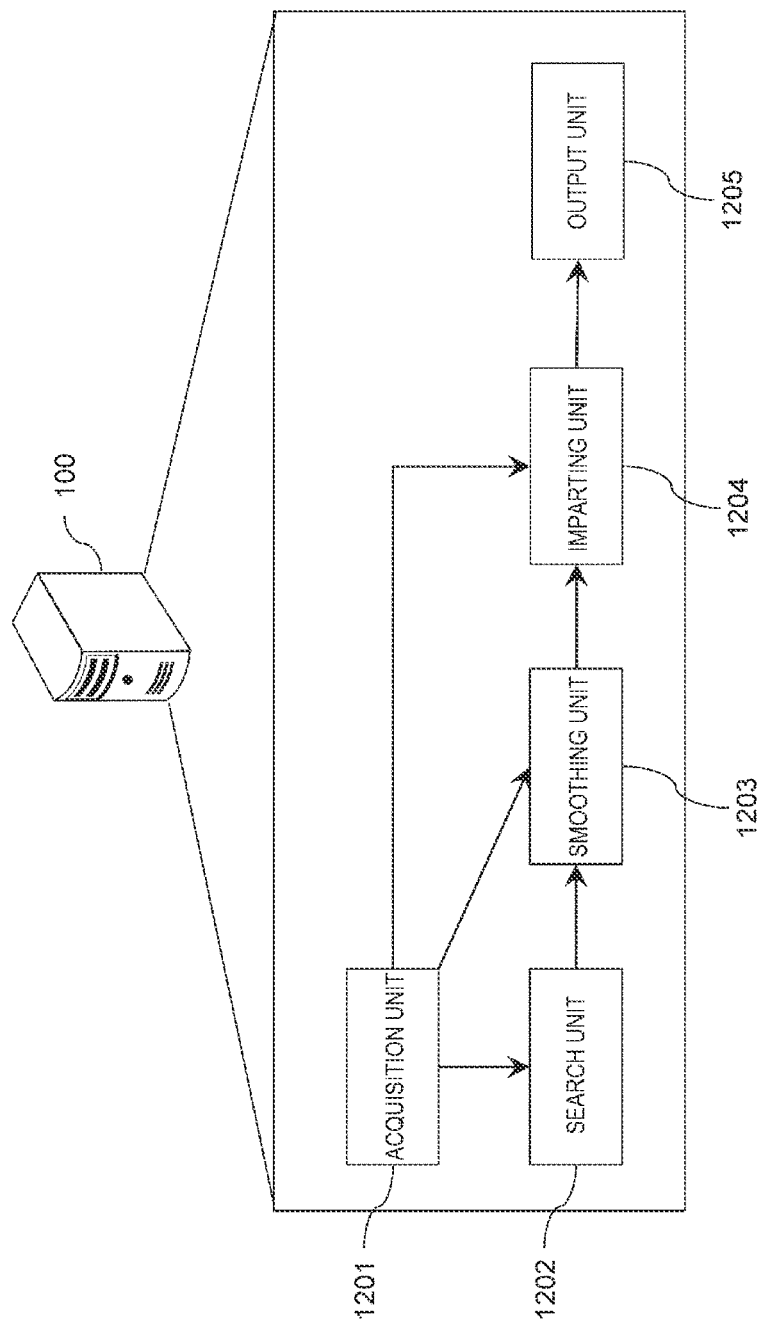

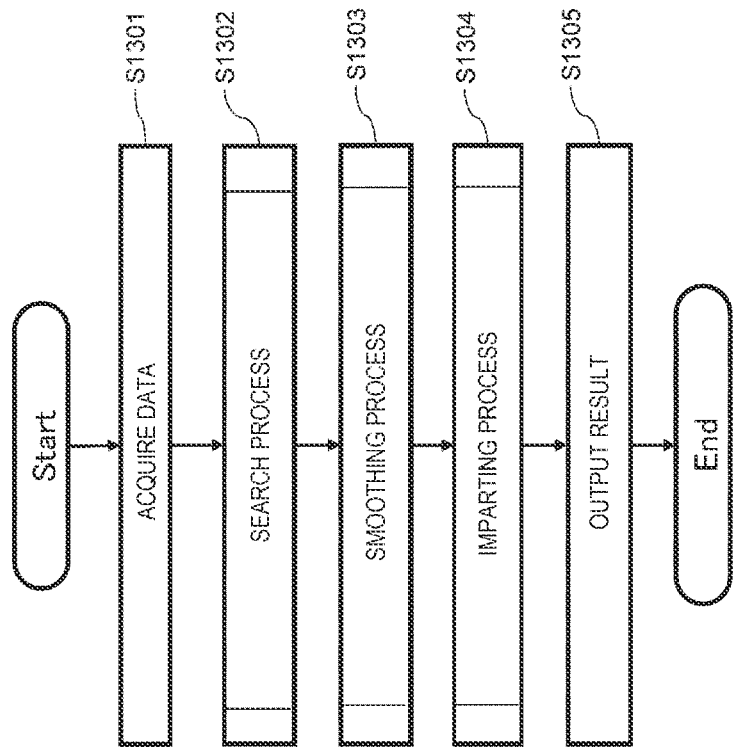
[FIG. 13]

[FIG. 14]
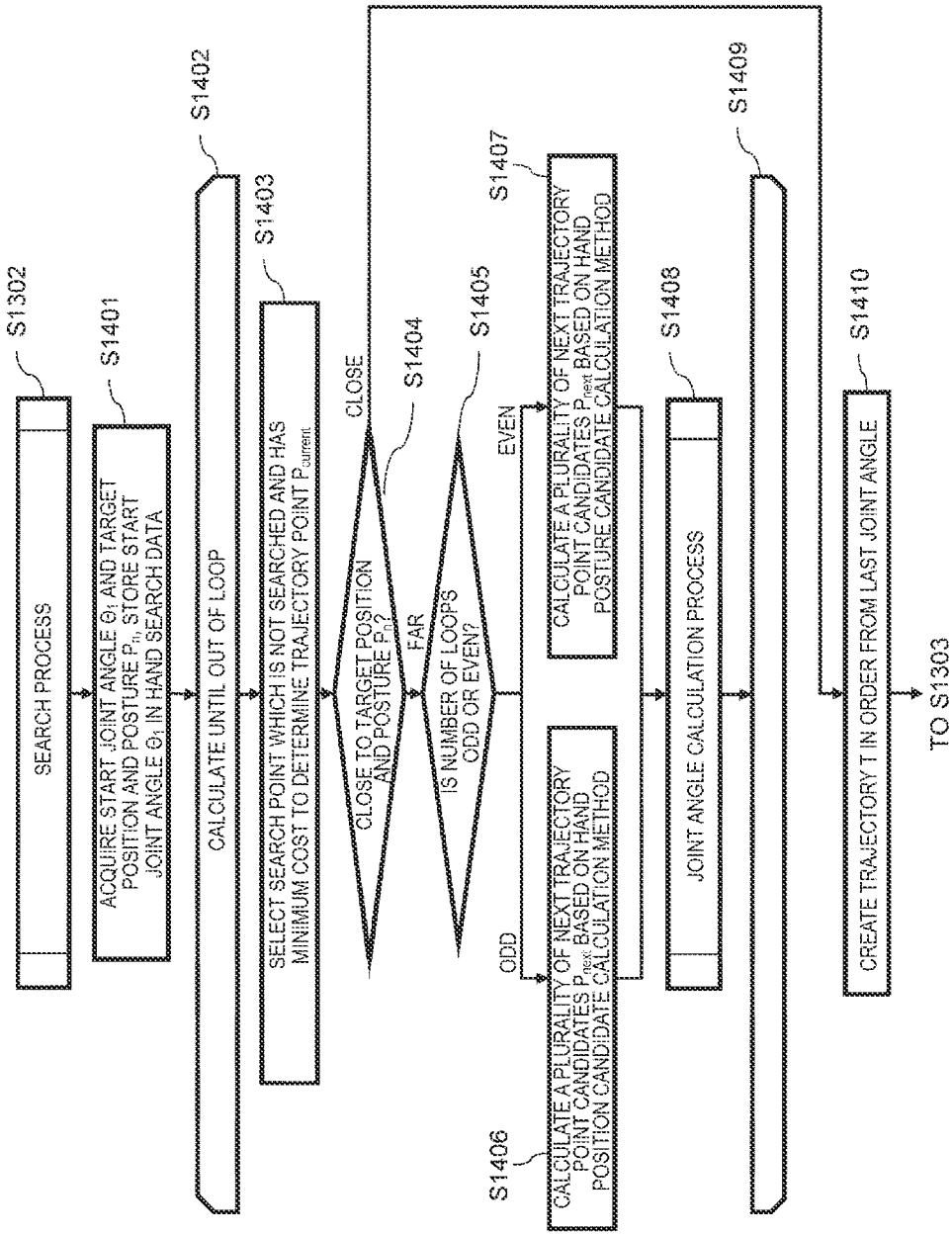

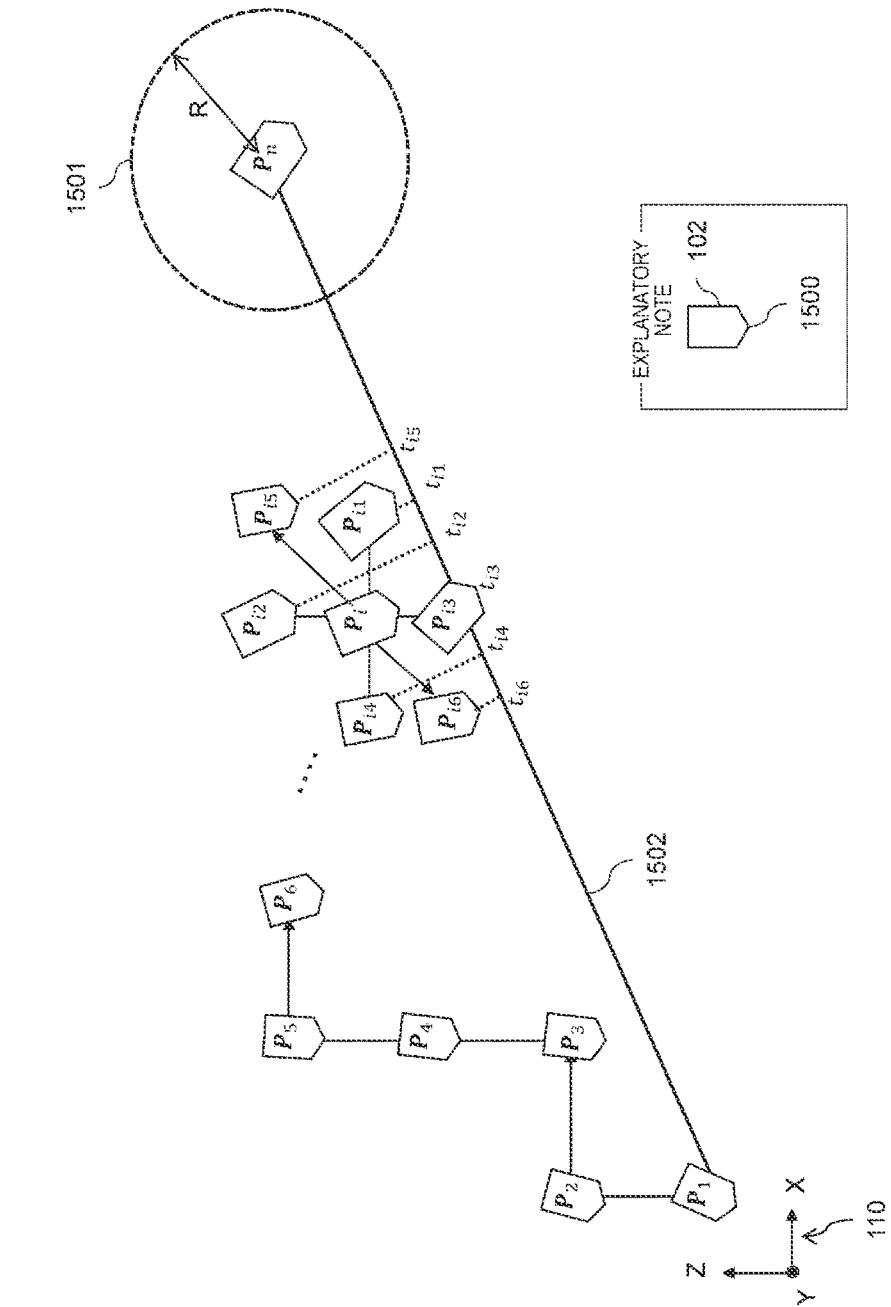

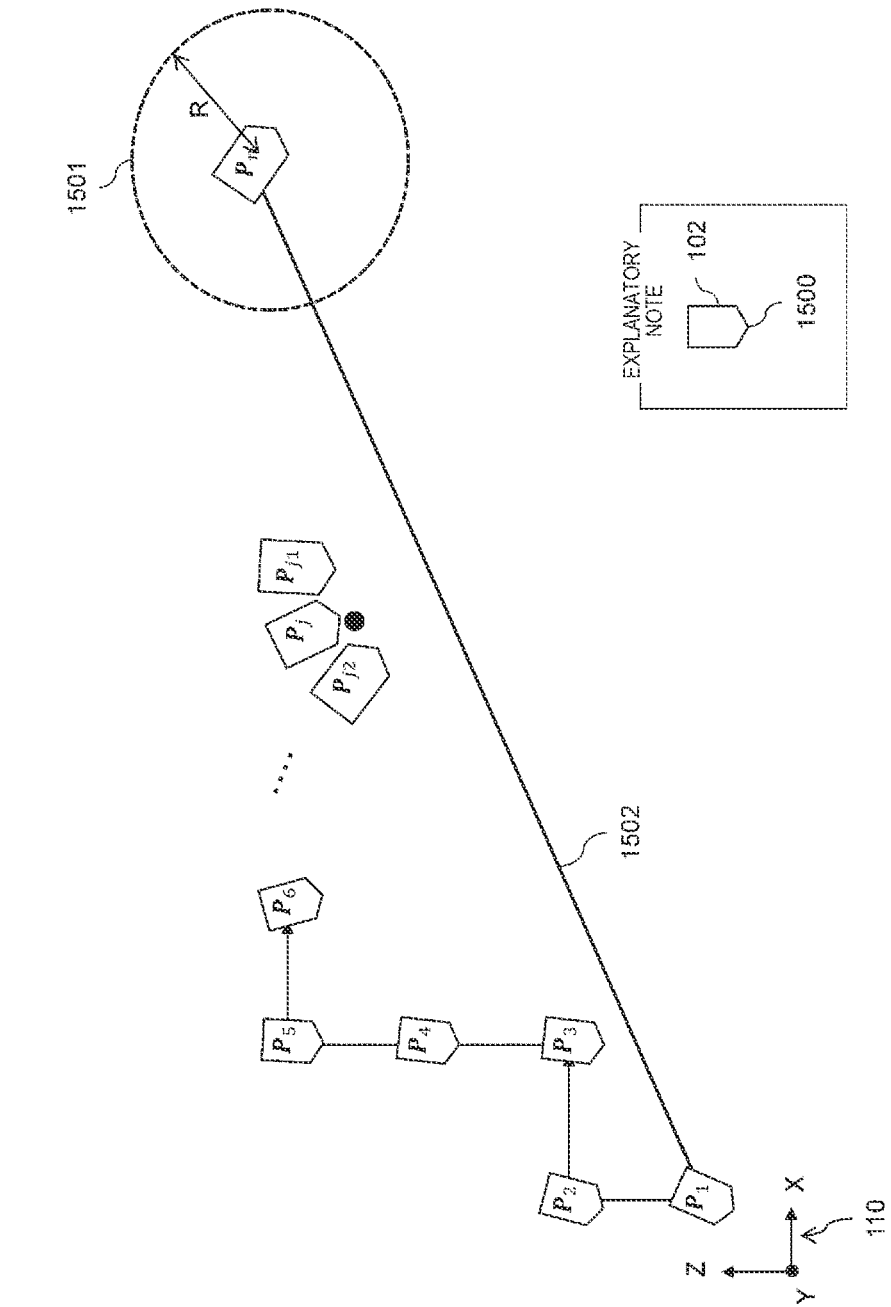

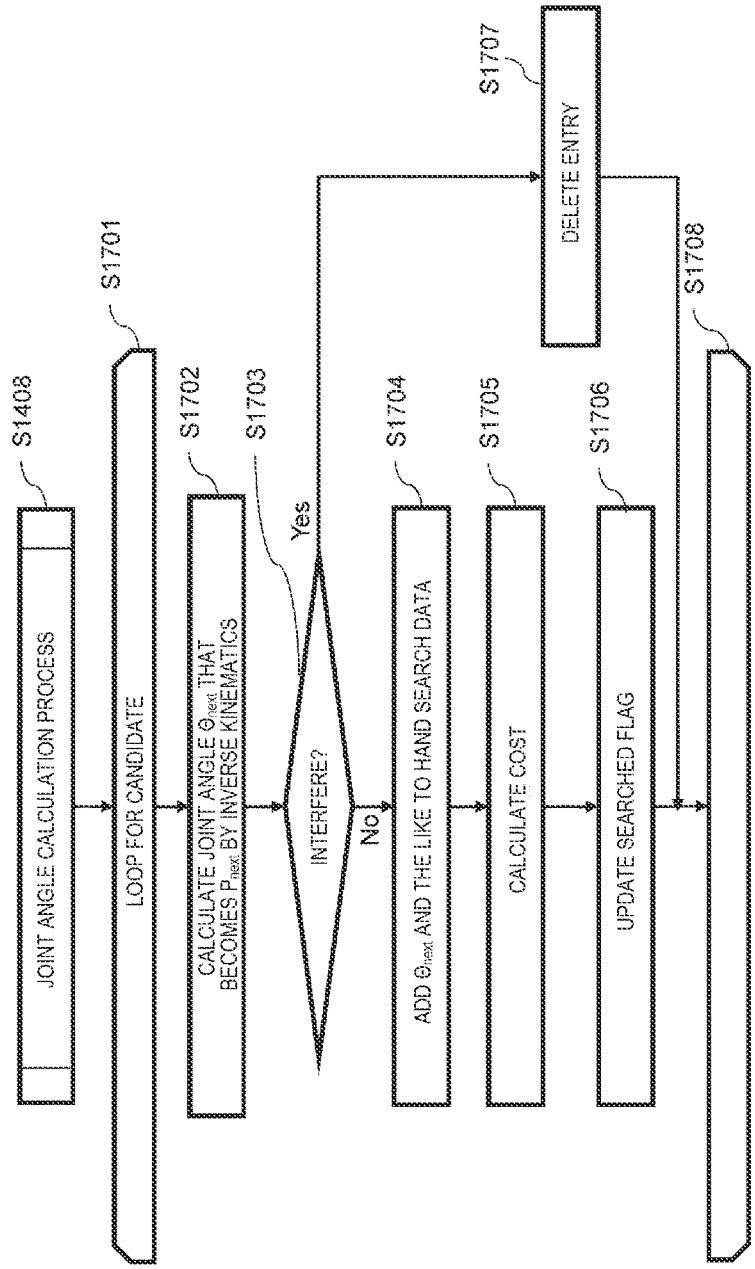
[FIG. 17]

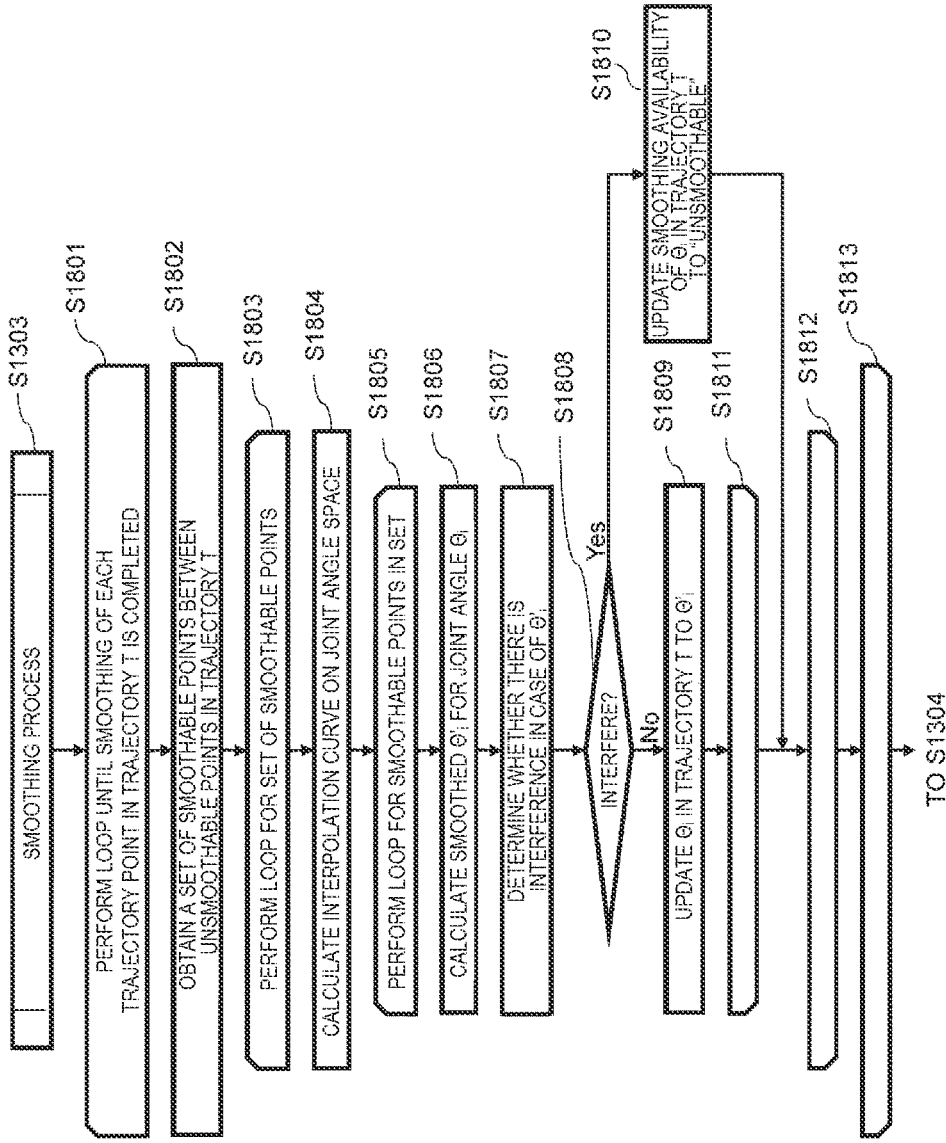
[FIG. 18]

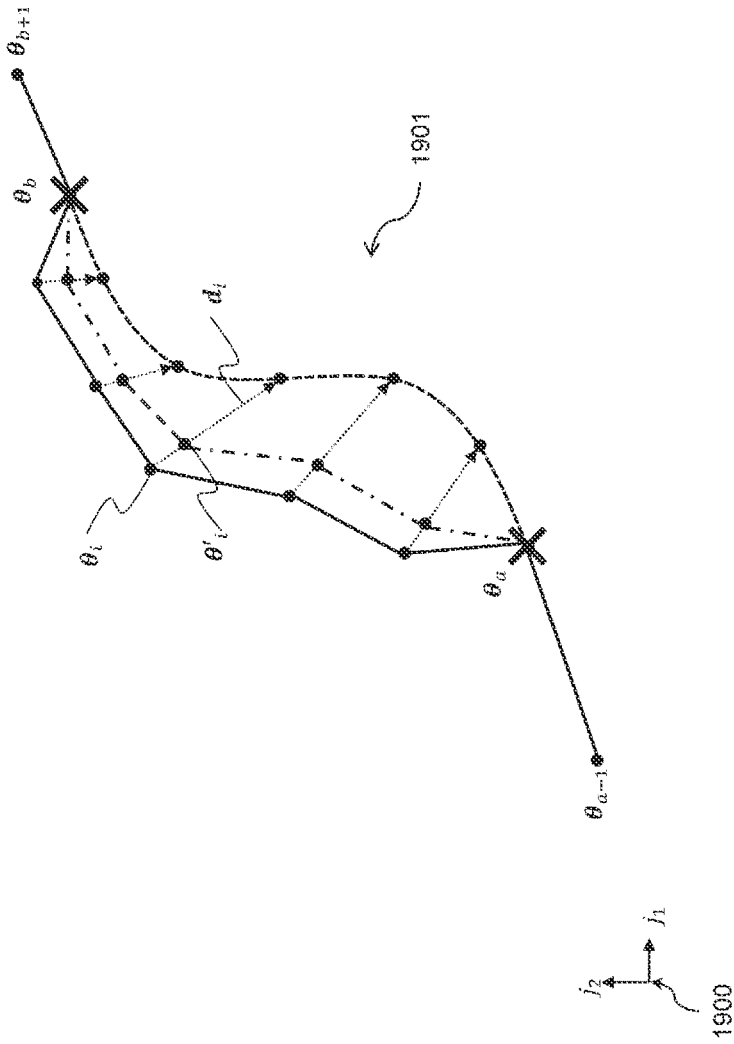
[FIG. 19]

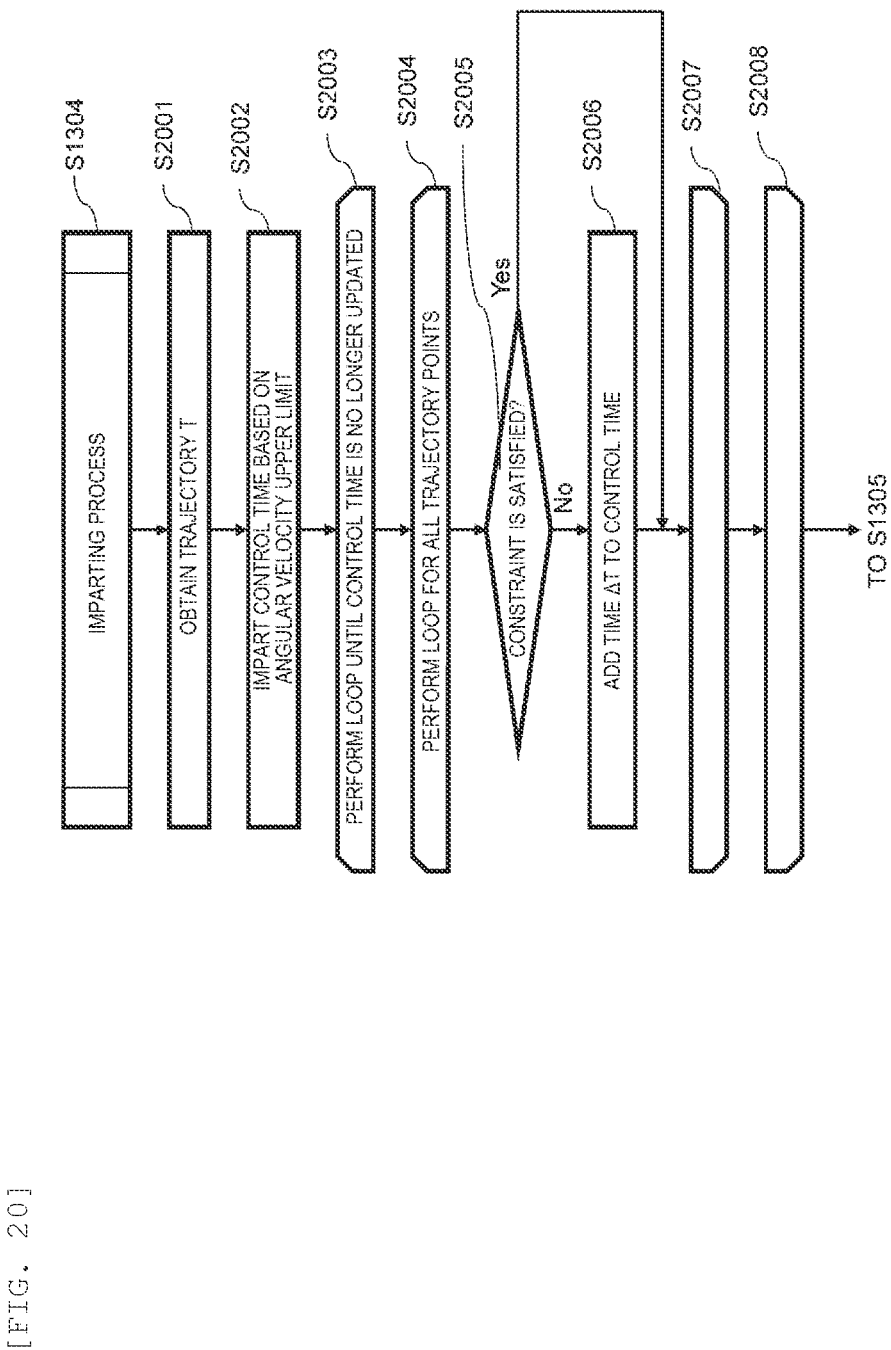
[FIG. 20]

TRAJECTORY PLAN GENERATION DEVICE, TRAJECTORY PLAN GENERATION METHOD, AND TRAJECTORY PLAN GENERATION PROGRAM

INCORPORATION BY REFERENCE

The present application claims priority from Japanese Patent Application No. 2019-208578 filed on Nov. 19, 2019, contents of which are incorporated into the present application by reference.

TECHNICAL FIELD

The present invention relates to a trajectory plan generation device for generating a trajectory plan, a trajectory plan generation method, and a trajectory plan generation program.

BACKGROUND ART

PTL 1 is a background art in this technical field. A trajectory planning device of PTL 1 includes a distance calculation unit that calculates a distance between a robot and an obstacle on a planned trajectory, a discretization setting unit that sets a discretization width for discretizing a trajectory from a start point to an end point based on the distance calculated by the distance calculation unit, an interference determination unit that determines whether the robot and the obstacle interfere with each other at each position on the trajectory when discretized with the discretization width set by the discretization setting unit, and a trajectory planning unit that plans a trajectory of the robot based on an interference determination result by the interference determination unit.

CITATION LIST

Patent Literature

PTL 1: JP-A-2013-246553

SUMMARY OF INVENTION

Technical Problem

The trajectory planning device of PTL 1 calculates a trajectory separated by a certain distance or more from a surrounding obstacle based on the interference determination. However, since the trajectory planning device of PTL 1 calculates the trajectory without considering a hand posture, a posture of a gripped object may change abruptly, which may damage the gripped object. In addition, when a control time is delayed in order to reduce the damage to the gripped object, a cycle time is extended, and productivity is reduced.

An object of the invention is to make a plan for stabilizing an object to be held.

Solution to Problem

A trajectory plan generation device according to one aspect of the invention disclosed in the present application is a trajectory plan generation device that includes a processor configured to execute a program and a storage device configured to store the program, and is configured to generate a trajectory plan in which a tip portion of a robot arm having a plurality of joints moves from a start point to an end point. The processor is configured to execute: a first search process for searching for a plurality of position candidates which are movement destinations of the tip portion within a predetermined distance from first trajectory information indicating positions and postures of the tip portion between the start point and the end point, a second search process for searching for a plurality of posture candidates of the tip portion that change within an allowable range by spherical interpolation based on postures of the tip portion at the start point and the end point, a determination process for determining second trajectory information indicating positions and postures of movement destinations of the tip portion from the first trajectory information based on the plurality of position candidates searched for by the first search process and the plurality of posture candidates searched for by the second search process, and an output process for outputting trajectory data including the first trajectory information and the second trajectory information determined by the determination process.

Advantageous Effect

According to a representative embodiment of the invention, it is possible to make a plan for stabilizing an object to be held. Problems, configurations, and effects other than those described above will be clarified by the descriptions of the following embodiment.

BRIEF DESCRIPTION OF DRAWINGS

FIG. 1 is an illustrative diagram illustrating a trajectory plan generation example.

FIG. 2 is a block diagram illustrating a hardware configuration example of a trajectory plan generation device.

FIG. 3 is an illustrative diagram illustrating an example of a robot arm configuration DB.

FIG. 4 is an illustrative diagram illustrating an example of an obstacle configuration DB.

FIG. 5 is an illustrative diagram illustrating an example of a start joint angle DB.

FIG. 6 is an illustrative diagram illustrating an example of a target position and posture DB.

FIG. 7 is an illustrative diagram illustrating an example of a hand position candidate calculation method DB.

FIG. 8 is an illustrative diagram illustrating an example of a hand posture variation candidate calculation method DB.

FIG. 9 is an illustrative diagram illustrating an example of a control time imparting method DB.

FIG. 10 is an illustrative diagram illustrating an example of a trajectory point DB.

FIG. 11 is an illustrative diagram illustrating an example of hand search data.

FIG. 12 is a block diagram illustrating a functional configuration example of the trajectory plan generation device.

FIG. 13 is a flowchart illustrating a procedure example of a trajectory plan generation process by the trajectory plan generation device.

FIG. 14 is a flowchart illustrating a detailed process procedure example of a search process (step S1302) by a search unit illustrated in FIG. 13.

FIG. 15 is an illustrative diagram illustrating a calculation example of a trajectory point candidate based on a hand position candidate calculation method in step S1406.

FIG. 16 is an illustrative diagram illustrating a calculation example of a trajectory point candidate based on a hand position candidate calculation method in step S1407.

FIG. 17 is a flowchart illustrating a detailed process procedure example of a joint angle calculation process (step S1408) illustrated in FIG. 14.

FIG. 18 is a flowchart illustrating a detailed process procedure example of a smoothing process (step S1303) by a smoothing unit illustrated in FIG. 13.

FIG. 19 is an illustrative diagram illustrating a calculation example of an interpolation curve in step S1804.

FIG. 20 is a flowchart illustrating a detailed process procedure example of an imparting process (step S1304) by an imparting unit illustrated in FIG. 13.

DESCRIPTION OF EMBODIMENTS

<Trajectory Plan Generation Example>

FIG. 1 is an illustrative diagram illustrating a trajectory plan generation example. A trajectory plan generation device 100 plans continuous trajectory points P1 to Pn (n is an integer of 1 or more) of a robot arm 101, and generates trajectory plan data 120 of the robot arm. A series of operation tracks of the robot arm 101 at the trajectory points P1 to Pn is referred to as trajectory data T.

The robot arm 101 is a manipulator including m (m is an integer of 2 or more. In FIG. 1, m=4) joints J1 to Jm, m links L1 to Lm connecting the joints J1 to Jm, and a tip portion (also referred to as a "hand") 102 connected to the link Lm. A trajectory point P is trajectory information indicating a combination of a three-dimensional position of each joint and the tip portion of the robot arm 101 and postures of each of the links L1 to Lm and the tip portion 102 that change depending on operation of each of the joints J1 to Jm.

When the trajectory points P1 to Pn are not distinguished from each other, they are simply referred to as the trajectory point P. When the joints J1 to Jm are not distinguished from each other, they are simply referred to as a joint J. When the links L1 to Lm are not distinguished from each other, they are simply referred to as a link L. The robot arm 101 can be operated and controlled by the trajectory plan generation device 100 or another computer.

In FIG. 1, when a three-dimensional space spanned by an X axis, a Y axis, and a Z axis, which are orthogonal to each other, is used as a global coordinate system 110, the robot arm 101 is placed on an XY plane. The XY plane is a plane spanned by the X axis and the Y axis. In FIG. 1, the Z axis indicates, for example, a vertical direction, a direction from the bottom to the top is a +Z direction, and a direction from the top to the bottom is a −Z direction. In addition, a rotation angle and a rotation direction around the X axis are referred to as a roll r, a rotation angle and a rotation direction around the Y axis are referred to as a pitch p, and a rotation angle and a rotation direction around the Z axis are referred to as a yaw y. The joint J1 is located at an origin O.

In addition, a local coordinate system of each joint Jm is a three-dimensional space spanned by an Xm axis, a Ym axis, and a Zm axis which are orthogonal to each other with an origin On as a position of the joint Jm. Further, rotation angles and rotation directions around the Xm axis, the Ym axis, and the Zm axis are referred to as a roll rm, a pitch pm, and a yaw ym, respectively. The Xm axis is a longitudinal direction of the link L(m−1), and the Ym axis is an axis parallel to the XY plane. However, the Xm axis of the joint J1 is the Z axis of the global coordinate system 110.

The joint Jm rotates the link Lm or the tip portion 102. Specifically, for example, the joint J1 rotates the link L1 in a yaw direction y (a roll direction r1). The joint J1 does not rotate the link L1 in a roll direction r and a pitch direction p (a pitch direction p1 and a yaw direction y1).

The joint J2 rotates the link L2 in a roll direction r2 and a pitch direction p2. The joint J3 rotates the link L3 in a roll direction r3 and a pitch direction p3. The joint J4 rotates the tip portion 102 in a roll direction r4 and a pitch direction p4. The tip portion 102 holds an object 103. Specifically, the tip portion 102 is, for example, a suction nozzle, a magnet, or a handpiece.

When the robot arm 101 holds the object 103, in order to stably hold the object 103, the trajectory plan generation device 100 plans the trajectory points P1 to Pn so as not to change the postures of the tip portion 102 as much as possible and to interfere with an obstacle 104, and outputs the trajectory data T.

The trajectory plan data 120 is data for reproducing the trajectory data T. The trajectory plan data 120 includes a read button 121, a calculation start button 122, an information display unit 123, and a simulation moving image 124 that simulates a trajectory of the robot arm 101. The trajectory plan data 120 is displayed on a display of the trajectory plan generation device 100 or another computer communicably connected to the trajectory plan generation device 100.

When the read button 121 is pressed, data necessary for generating the trajectory plan data 120 is read. When the calculation start button 122 is pressed, calculation for generating the trajectory plan data 120 is started using the read data, and the trajectory data T is generated. When the calculation is completed, the information display unit 123 is displayed.

The information display unit 123 includes a condition 131 when the trajectory plan data 120 is calculated, an operation time 132 of the robot arm 101 under the condition 131, and an operation reproduction button 133 that reproduces the simulation moving image 124. When the operation reproduction button 133 is pressed, the simulation moving image 124 is reproduced at the operation time 132. As a result, a user can reproduce the trajectory data T by the simulation moving image 124 under each condition 131 and confirm the trajectory of the robot arm 101.

<Hardware Configuration Example of Trajectory Plan Generation Device 100>

FIG. 2 is a block diagram illustrating a hardware configuration example of the trajectory plan generation device 100. The trajectory plan generation device 100 includes a processor 201, a storage device 202, an input device 203, an output device 204, and a communication interface (communication IF) 205. The processor 201, the storage device 202, the input device 203, the output device 204, and the communication IF 205 are connected by a bus 206. The processor 201 controls the trajectory plan generation device 100. The storage device 202 serves as a work area of the processor 201. The storage device 202 is a non-transitory or transitory recording medium that stores various programs and data. The storage device 202 is, for example, a read only memory (ROM), a random access memory (RAM), a hard disk drive (HDD), and a flash memory. The input device 203 is a device that inputs data. The input device 203 is, for example, a keyboard, a mouse, a touch panel, a numeric keypad, and a scanner. The output device 204 is a device that outputs data. The output device 204 is, for example, a display and a printer. The communication IF 205 is connected to a network and transmits and receives data.

<Data Configuration Example>

Here, the data stored in the storage device 202 will be specifically described. The storage device 202 stores a robot arm configuration DB 211, an obstacle configuration DB 212, a start joint angle DB 213, a target position and posture DB 214, a hand position candidate calculation method DB 215, a hand posture variation candidate calculation method DB 216, a control time imparting method DB 217, a trajectory point DB 218, and hand search data 219. In addition, those described above may be stored in a storage device 202 of another computer accessible by the trajectory plan generation device 100. Hereinafter, the example will be described with reference to FIGS. 3 to 11.

FIG. 3 is an illustrative diagram illustrating an example of the robot arm configuration DB 211. The robot arm configuration DB 211 is a database that stores data related to the joint J and the link L constituting the robot arm 101, and specifically includes, for example, joint information DB 301 and link information DB 302.

The joint information DB 301 is a database that stores the information related to the joint J. Specifically, for example, the joint information DB 301 includes, as fields, a joint name 311, an operation type 312, a joint position 313, a rotation axis 314, an operation lower limit 315, an operation upper limit 316, a maximum velocity 317, and a maximum acceleration 318. A combination of values of each field in the same row constitutes one joint J.

The joint name 311 is a name that uniquely specifies the joint J. The operation type 312 indicates a type of operation of the joint J, such as rotation and parallel movement. The joint position 313 indicates a three-dimensional position (X, Y, Z) of the global coordinate system 110 from a previous joint J(m−1) in the global coordinate system 110. In addition, the joint position 313 of the joint J1 is the origin O of the global coordinate system 110.

The rotation axis 314 indicates an axis (a, b, c) (a, b, c=0 or 1) in which the joint J can rotate in the local coordinate system of the joint J. a corresponds to the Xm axis, b corresponds to the Ym axis, and c corresponds the Zm axis, "0" indicates that the axis is not the rotation axis 314, and "1" indicates that the axis is the rotation axis 314. In FIG. 3, the joint J1 rotates the link L1 in the roll direction r1 (the roll direction r) around the X1 axis (the Z axis), and thus the rotation axis 314 of the joint J1 is represented by (1, 0, 0).

The operation lower limit 315 is a lower limit value in which the joint J can operate, the operation upper limit 316 is an upper limit value in which the joint J can operate indirectly, and the joint J can perform the operation indicated by the operation type 312 in a range from the operation lower limit 315 to the operation upper limit 316.

The maximum velocity 317 is a maximum value of an operation velocity of the joint J. When the operation type 312 is "rotation", the operation velocity is a rotation velocity. The maximum acceleration 318 is a maximum value of an operation acceleration of the joint J. When the operation type 312 is "rotation", the operation velocity is a rotation acceleration.

The link information DB 302 is a database that stores the information related to the link L. Specifically, for example, the link information DB 302 includes, as fields, a link name 321, a parent joint name 322, a child joint name 323, and a link shape 324. A combination of values of each field in the same row defines joint information of one link L.

The link name 321 is a name that uniquely specifies the link L. The parent joint name 322 is a joint name 311 of the joint J that operates the link L. The child joint name 323 is a joint name 311 of the joint J(m+1) connected to the link Lm. For example, in the case of the link L1, the parent joint name 322 is J1, and the child joint name 323 is J2.

The link shape 324 is an actual shape of the link L, and is, for example, solid data saved in a format such as standard for the exchange of product model data (STEP), or polygon data saved in a format such as stereolithography (STL).

FIG. 4 is an illustrative diagram illustrating an example of the obstacle configuration DB 212. The obstacle configuration DB 212 is a database that stores data constituting an obstacle. Specifically, for example, the obstacle configuration DB 212 includes, as fields, an obstacle ID 401, an obstacle shape 402, and an obstacle position and posture 403. A combination of values of each field in the same row constitutes one obstacle 104.

The obstacle ID 401 is identification information that uniquely identifies the obstacle 104. The obstacle shape 402 is an actual shape of the obstacle 104, and is, for example, solid data saved in a format such as STEP or polygon data saved in a format such as STL. The obstacle position and posture 403 is information that defines a center position (X, Y, Z) and posture (a roll angle r, a pitch angle p, and a yaw angle y) of the obstacle 104 in the global coordinate system 110.

FIG. 5 is an illustrative diagram illustrating an example of the start joint angle DB 213. The start joint angle DB 213 is a database that stores a start joint angle 501 of the joint J. The start joint angle 501 is an initial value of an angle around the rotation axis 314 of the joint specified by the joint name 311, that is, an angle before start of the operation. When there are a plurality of rotation axes 314 (for example, the rotation axis 314=(1, 1, 0)), the start joint angle 501 is set for each rotation axis 314. A column of values of the start joint angles 501 of all the joints J1 to J4 is referred to as a start joint angle vector θ1.

FIG. 6 is an illustrative diagram illustrating an example of the target position and posture DB 214. The target position and posture DB 214 is a database that stores a target position and a posture of the tip portion 102. Specifically, for example, the target position and posture DB 214 includes, as fields, a posture ID 601, a target link name 602, and position and posture information 603. A combination of values of each field in the same row constitutes a trajectory point Pn (hereinafter, also referred to as a target position posture Pn) which is one target position and posture.

The posture ID 601 is identification information that uniquely specifies the posture. The target link name 602 is the link name 321 of the link L connected to the tip portion 102. The position and posture information 603 is information that defines a center position (X, Y, Z) and the posture of the tip portion 102 in the global coordinate system 110. Specifically, the posture of the tip portion 102 is, for example, a posture of the joint Jm to which the tip portion 102 is connected (a roll angle rm, a pitch angle pm, and a yaw angle ym). One or more entries for the target position and posture DB 214 are present, but any one of the entries is selected from the outside.

FIG. 7 is an illustrative diagram illustrating an example of the hand position candidate calculation method DB 215. The hand position candidate calculation method DB 215 is a database that defines a hand position candidate calculation method 701. Specifically, for example, the hand position candidate calculation method DB 215 includes, as fields, the hand position candidate calculation method 701 and a maximum movement distance 702 in one step. A combination of values of each field in the same row constitutes one hand position candidate calculation method 701.

The hand position candidate calculation method 701 is one of various calculation methods corresponding to a method for calculating a hand position candidate. For example, there is a method such as an axis parallel or a random method. The maximum movement distance 702 in one step is a maximum value of a movement distance of the tip portion 102 in a process of one step (one process of step S1406 to be described later).

FIG. 8 is an illustrative diagram illustrating an example of the hand posture variation candidate calculation method DB 216. The hand posture variation candidate calculation method DB 216 is a database that defines a hand posture variation candidate calculation method. Specifically, for example, the hand posture variation candidate calculation method DB 216 includes, as fields, a roll angle maximum displacement 801, a pitch angle maximum displacement 802, a yaw angle maximum displacement 803, and a maximum displacement 804 in one step. A combination of values of each field in the same row constitutes one hand posture variation candidate calculation method.

The roll angle maximum displacement 801 is a maximum value of a displacement amount of the roll angle rm. The pitch angle maximum displacement 802 is a maximum value of a displacement amount of the pitch angle pm. The yaw angle maximum displacement 803 is a maximum value of displacement of the yaw angle ym. The roll angle maximum displacement 801, the pitch angle maximum displacement 802, and the yaw angle maximum displacement 803 are used in the hand position candidate calculation method 701 and are the maximum displacement angles from a reference posture. The reference posture is a posture (rm, pm, ym) of the joint Jm when the longitudinal direction of the link L(m−1) is set to the Xm axis. The maximum displacement 804 in one step is a maximum displacement of the posture of the tip portion 102 in one process (one process of step S1407 to be described later).

FIG. 9 is an illustrative diagram illustrating an example of the control time imparting method DB 217. The control time imparting method DB 217 is a database that stores a control time imparting method. Specifically, for example, the control time imparting method DB 217 includes, as fields, a parameter ID 901, a hand maximum velocity 902, and a hand maximum acceleration 903. A combination of values of each field in the same row constitutes one control time imparting method.

The parameter ID 901 is identification information that uniquely specifies a control time imparting method defined by the hand maximum velocity 902 and the hand maximum acceleration 903. The hand maximum velocity 902 is a maximum value of a velocity of the tip portion 102. The hand maximum acceleration 903 is a maximum value of an acceleration of the tip portion 102.

FIG. 10 is an illustrative diagram illustrating an example of the trajectory point DB 218. The trajectory point DB 218 is a database that stores trajectory point data. The trajectory point data is data which is a basis of the trajectory plan data 120. The trajectory point DB 218 includes, as fields, a trajectory point ID 1001, a joint angle 1002, a joint angular velocity 1003, a joint angular acceleration 1004, smoothing availability 1005, and a control time 1006. A combination of values of each field in the same row constitutes the trajectory point data indicating one trajectory point P.

The trajectory point ID 1001 is identification information that uniquely specifies the trajectory point P. Among the trajectory points P1 to Pn, the trajectory point P1 at an initial position may be referred to as a "start point", and the trajectory point Pn at a final position may be referred to as an "end point".

The joint angle 1002 is an angle around the rotation axis 314 of the joint J at each of the trajectory points P1 to Pn illustrated in FIG. 1. For example, when "P1" of the trajectory point ID 1001 is the start point, the joint angle 1002 is the start joint angle 501 (θ1).

The joint angular velocity 1003 is an angular velocity around the rotation axis 314 of the joint J at each of the trajectory points P1 to Pn illustrated in FIG. 1. The joint angular acceleration 1004 is an angular acceleration around the rotation axis 314 of the joint J at each of the trajectory points P1 to Pn illustrated in FIG. 1.

The smoothing availability 1005 is information indicating whether the trajectory point P can be smoothed. The smoothing is a process for smoothing the trajectory of the robot arm 101. "FALSE" indicates that the trajectory point P cannot be smoothed, and "TRUE" indicates that the trajectory point P can be smoothed. An initial value is "TRUE", and when the smoothing is executed, the initial value is updated to "FALSE" (step S1810). However, for the start point P1 and the end point Pn, the initial value of the smoothing availability 1005 is "FALSE".

The control time 1006 is a time at which the robot arm 101 is controlled to the trajectory point P. The control time 1006 of the start point P1 is set to "0", and the control time 1006 of the other trajectory point P is an elapsed time from the control time 1006 of the start point P1. In addition, the control time 1006 may be an elapsed time from the previous trajectory point P. The control time 1006 is imparted in an imparting process of the control time 1006 (step S1304) illustrated in FIGS. 13 and 20 to be described later.

FIG. 11 is an illustrative diagram illustrating an example of the hand search data 219. The hand search data 219 is data temporarily stored in a cache memory of the storage device 202 and saved as a log. The hand search data 219 is data for searching for the trajectory point.

The hand search data 219 includes, as fields, a search point ID 1101, a joint angle 1102, a hand position 1103, a difference posture 1104, a previous search point ID 1105, a cost 1106, and a searched flag 1107.

The search point ID 1101 is identification information that uniquely specifies a search point. The search point is a candidate point of the tip portion 102 indicating a candidate position and a candidate posture of the tip portion 102. A plurality of candidate points are generated except for an initial search point (search point ID: D001). Branch numbers are imparted to the candidate points. In (A) of FIG. 11, entries of a plurality of search point IDs: D002-1, D002-2, D002-3 are generated as movement destination candidates from the hand position 1103 of the initial search point (search point ID: D001).

The joint angle 1102 is an angle around the rotation axis 314 of each joint J, which is the candidate posture of the tip portion 102. The hand position 1103 is a three-dimensional position of the global coordinate system 110, which is the candidate position of the tip portion 102. The hand position 1103 is determined by forward kinematics based on the joint angle 1102. In addition, the posture of the hand position 1103 is the posture (roll angle, pitch angle, and yaw angle) of the joint Jm connected to the tip portion 102.

The difference posture 1104 is a difference ($\Delta r_{current}$, $\Delta p_{current}$, $\Delta y_{current}$) of a current hand posture from a spherical interpolation posture by a spherical interpolation function SLERP. Specifically, for example, the difference posture 1104 is a value obtained by adding displacement amounts $\Delta r$, $\Delta p$, and $\Delta y$ to the difference posture 1104 of the previous search point. Since the previous search point does not exist, the difference posture 1104 of the initial search point (search point ID: D001) is (0, 0, 0). Each of the displacement amounts $\Delta r$, $\Delta p$, $\Delta y$ is the maximum displacement 804 in one step, and can be added up to the roll angle maximum displacement 801, the pitch angle maximum displacement 802, and the yaw angle maximum displacement 803, respectively.

The previous search point ID 1105 is the previous search point ID 1101. Since there is no previous search point for the initial search point (search point ID 1101: D001), the previous search point ID 1105 becomes "NULL". The cost 1106 is a value based on a distance between a search point specified by the search point ID 1101 and a target position. In this example, the cost 1106 increases as the distance increases. The cost 1106 of the initial search point (search point ID 1101: D001) is set to "0".

In (A) of FIG. 11, entries of a plurality of search point IDs 1101: D002-1, D002-2, and D002-3 are generated as movement destination candidates from the hand position 1103 of the initial search point (search point ID 1101: D001). Among them, the entry having a smallest cost 1106 is the search point ID 1101: D002-2. Therefore, as illustrated in (B) of FIG. 11, the search point ID 1101: D002-2 is determined as the movement destination from the hand position 1103 of the initial search point (search point ID 1101: D001), and the entries of the search point IDs 1101: D002-1 and D002-3 are deleted.

The searched flag 1107 is a flag indicating whether the search point of the entry has been searched. If the search point is searched, the searched flag 1107 is "True", and if the search point is not searched, the searched flag 1107 is "False". An initial value of the searched flag 1107 is "False". The searched flag 1107 is updated from "False" to "True" when the search point of the entry is determined as the movement destination of the tip portion 102 at the previous determined search point. The entries that have not been updated are deleted.

In the example of FIG. 11, since the search point ID 1101: D002-2 is determined as the movement destination from the hand position 1103 of the initial search point (search point ID 1101: D001), the searched flag 1107 is updated from "False" to "True". Then, the entries of the search point IDs 1101: D002-1 and D002-3 in which the searched flag 1107 is not updated from "False" to "True" are deleted.

<Functional Configuration Example of Trajectory Plan Generation Device 100>

FIG. 12 is a block diagram illustrating a functional configuration example of the trajectory plan generation device 100. The trajectory plan generation device 100 includes an acquisition unit 1201, a search unit 1202, a smoothing unit 1203, an imparting unit 1204, and an output unit 1205. Specifically, the acquisition unit 1201, the search unit 1202, the smoothing unit 1203, the imparting unit 1204, and the output unit 1205 have, for example, a function realized by causing the processor 201 to execute a program stored in the storage device 202.

<Procedure Example of Trajectory Plan Generation Process>

FIG. 13 is a flowchart illustrating a procedure example of a trajectory plan generation process by the trajectory plan generation device 100. The acquisition unit 1201 acquires data necessary for the search unit 1202, the smoothing unit 1203, and the imparting unit 1204 from the storage device 202, and outputs the data to the search unit 1202, the smoothing unit 1203, and the imparting unit 1204 (step S1301).

Next, the search unit 1202 performs a search process for searching for a search point to the target position (step S1302). Specifically, for example, the search unit 1202 calculates the trajectory data T from the trajectory point P1, which is the start joint angle 501 ($\theta$1) of the robot arm 101, to the target position and posture Pn of the tip portion 102 by an A-Star method. Details of the search process (step S1302) will be described later with reference to FIG. 14.

Next, the smoothing unit 1203 performs a smoothing process for smoothing the trajectory data T (step S1303). Details of the smoothing process (step S1303) will be described later with reference to FIG. 18. Next, the imparting unit 1204 performs an imparting process for imparting the control time 1006 to the trajectory point P in consideration of a posture change of the tip portion 102 (step S1304). Details of the imparting process (step S1304) will be described later with reference to FIG. 20.

Next, as illustrated in FIG. 1, the output unit 1205 generates the trajectory plan data 120 capable of reproducing the trajectory data T and outputs the trajectory plan data 120 from the output device 204 or the communication IF 205.

<Search Process (Step S1302)>

FIG. 14 is a flowchart illustrating a detailed process procedure example of the search process (step S1302) by the search unit 1202 illustrated in FIG. 13. The search unit 1202 acquires the start joint angle 501 ($\theta$1) from the start joint angle DB 213 by the acquisition unit 1201, and acquires the target position and posture Pn from the target position and posture DB 214 by the acquisition unit 1201. Then, the search unit 1202 numbers D001 which is the search point ID 1101 of the hand search data 219, and stores the acquired start joint angle 501 ($\theta$1) in the joint angle 1102 of the entry of D001 (step S1401).

Next, the search unit 1202 executes a loop process of steps S1403 to S1408 (step S1402). Specifically, for example, the search unit 1202 selects a search point which is not searched (the searched flag 1107 is False) and has a minimum cost 1106 from the hand search data 219, and determines a trajectory point $P_{current}$ (step S1403). Next, the search unit 1202 determines whether the trajectory point $P_{current}$ is close to the target position and posture Pn (step S1404). Specifically, for example, the search unit 1202 determines whether the trajectory point $P_{current}$ is located within a sphere 1501 (see FIG. 15) having a radius R centered on the target position and posture Pn.

When the trajectory point $P_{current}$ is far from the target position and posture Pn, that is, when the trajectory point $P_{current}$ is not located within the sphere having the radius R (step S1404: NO), the search unit 1202 determines whether the number of loops in step S1402 is odd or even (step S1405). Step S1405 is a process for alternately executing steps S1406 and S1407.

When the number of loops is odd (step S1405: odd), based on the hand position candidate calculation method 701 of the hand position candidate calculation method DB 215, a plurality of search points which are next trajectory point candidates $P_{next}$ which are movement destinations from the current trajectory point $P_{current}$ of the tip portion 102 are calculated (step S1406), and the process proceeds to step S1408. As a result, the hand position can be smoothly changed. Specifically, for example, the current trajectory point $P_{current}$ of the tip portion 102 is the search point selected in step S1403 from the plurality of search points of the previous loop obtained in step S1407.

However, when the number of loops is the first, the current trajectory point of the tip portion 102 is the trajectory point P1. The search unit 1202 issues a plurality of search point IDs 1101, stores the three-dimensional position of the tip portion 102 which is the trajectory point candidate $P_{next}$ in the hand position 1103 of each entry of the search point ID 1101, and also stores the previous search point ID 1105.

Here, for convenience of description, position information is denoted by O and posture information is denoted by Q among the pieces of information constituting the next trajectory point candidate $P_{next}$. Assuming that the current hand position 1103 is $O_{current}$ and the difference posture 1104 from the spherical interpolation posture is $\Delta Q_{current}$, next position information $O_{next}$ and next posture information $Q_{next}$ constituting the next trajectory point candidate $P_{next}$ are calculated for each search point by the following Equations (1) to (3).

[Math. 1]

$$O_{next} = O_{current} + \Delta O \quad (1)$$

$$t_{next} = (O_{next} - O_1) \cdot \left( \frac{O_n - O_1}{\|O_n - O_1\|^2} \right) \quad (2)$$

$$Q_{next} = \text{Slerp}(Q_1, Q_n, t_{next}) \Delta Q_{current} \quad (3)$$

In Equation (1), $\Delta O$ is a movement amount generated according to the hand position candidate calculation method 701, and for example, when the axis parallel is designated as the hand position candidate calculation method 701, assuming that the maximum movement distance 702 is d, $\Delta O$ is a movement direction vector of the tip portion 102 in the following six ways. In this way, six types of position information Oi1 to Oi6 are obtained as the next position information $O_{next}$.

$(\pm d, 0, 0)^T$
$(0, \pm d, 0)^T$
$(0, 0, \pm d)^T$

SLERP of the above Equation (3) means a spherical interpolation function. Step S1406 will be described with reference to FIG. 15.

<Calculation Example of Trajectory Point Candidate $P_{next}$ Based on Hand Position Candidate Calculation Method 701>

FIG. 15 is an illustrative diagram illustrating a calculation example of the trajectory point candidate $P_{next}$ based on the hand position candidate calculation method 701 in step S1406. In FIG. 15, a pentagonal figure shows the tip portion 102, and a protruding vertex 1500 corresponds to a holding surface of the object 103. FIG. 15 shows a state in which the trajectory points P1, P2, P3, P4, P5, P6, ... Pi are generated in this order, and search points Pi1 to Pi6 are generated in step S1406 as the next trajectory point candidate $P_{next}$. Positions of the search points Pi1 to Pi6 are defined by the position information Oi1 to Oi6 described above.

The search unit 1202 calculates ti1 to ti6 by the above Equation (2) as lengths obtained by orthographic projection from the search points Pi1 to Pi6 to a vector 1502 connecting the trajectory point P1 and the target position and posture Pn. By using the ti1 to ti6, the search unit 1202 calculates posture information Qi1 to Qi6 at the respective search points Pi1 to Pi6 by the spherical interpolation function SLERP of the above Equation (3). In this way, the search points Pi1=(Oi1, Qi1) to Pi6=(Oi6, Qi6) are obtained. By using the above Equations (1) to (3), it is possible to calculate the trajectory point candidate $P_{next}$ of the tip portion 102 moving on the space while minimizing the posture change of the tip portion 102.

Return to FIG. 14. On the other hand, when the number of loops is even (step S1405: even), a plurality of next trajectory point candidates $P_{next}$ to be displacement destinations at the current trajectory point $P_{current}$ of the tip portion 102 are calculated based on the hand posture variation candidate calculation method DB 216 (step S1407), and the process proceeds to step S1408. As a result, the hand posture can be smoothly changed. Specifically, for example, the current trajectory point $P_{current}$ of the tip portion 102 is the search point selected in step S1403 from the plurality of search points of the previous loop obtained in step S1406. The search unit 1202 issues the plurality of search point IDs 1101, stores the three-dimensional position of the tip portion 102 which is the trajectory point candidate $P_{next}$ in the hand position 1103 of each entry of the search point ID 1101, and also stores the previous search point ID 1105.

Specifically, for example, the search unit 1202 calculates the trajectory point candidate $P_{next}$ in step S1406 using the following Equations (4) to (10).

[Math. 2]

$$\text{DIFFERENCE POSTURE} \begin{cases} \Delta r_{next} = \Delta r_{current} \pm \Delta r & (4) \\ \Delta p_{next} = \Delta p_{current} \pm \Delta p & (5) \\ \Delta y_{next} = \Delta y_{current} \pm \Delta y & (6) \end{cases}$$

$$\Delta Q_{next} = R_x(\Delta r_{next}) R_y(\Delta p_{next}) R_z(\Delta y_{next}) \quad (7)$$

$$t_{next} = (O_{current} - O_1) \cdot \left( \frac{O_n - O_1}{\|O_n - O_1\|^2} \right) \quad (8)$$

$$Q_{next} = \text{Slerp}(Q_1, Q_n, t_{next}) \Delta Q_{next} \quad (9)$$

$$O_{next} = O_{current} \quad (10)$$

In Equations (4) to (7), $\Delta r_{next}$, $\Delta p_{next}$, and $\Delta y_{next}$ indicate displacement amounts of the roll angle r, the pitch angle p, and the yaw angle y, and the maximum displacement 804 in one step of the hand posture variation candidate calculation method DB 216 is used. However, $\Delta r_{next}$, $\Delta p_{next}$, and $\Delta y_{next}$ are cumulatively added each time the trajectory point P is generated, and thus set so as not to exceed the roll angle maximum displacement 801, the pitch angle maximum displacement 802, and the yaw angle maximum displacement 803. $\Delta r_{current}$, $\Delta p_{current}$, and $\Delta y_{current}$ on a right side of the above Equations (1) to (3) are the difference postures 1104 from the spherical interpolation posture.

In addition, the above Equation (7) is an equation for calculating a posture displacement amount $\Delta Q_{next}$. Rx, Ry, and Rz on a right side of the above Equation (7) respectively mean rotation of the joint Jn around the xn axis, the yn axis and the zn axis. The search unit 1202 calculates the posture displacement amount $\Delta Q_{next}$ from a reference posture from these values, and calculates the next posture information $Q_{next}$ based on the posture displacement amount $\Delta Q_{next}$. At this time, a position of the trajectory point candidate $P_{next}$ does not change. This candidate calculation process will be described with reference to FIG. 16.

<Calculation Example of Trajectory Point Candidate $P_{next}$ Based on Hand Posture Variation Candidate Calculation Method>

FIG. 16 is an illustrative diagram illustrating a calculation example of the trajectory point candidate $P_{next}$ based on the hand position candidate calculation method in step S1407. Similar to FIG. 15, the pentagonal figure shows the tip portion 102, and the protruding vertex 1500 corresponds to the holding surface of the object 103.

FIG. 16 shows a state in which the trajectory points P1, P2, P3, P4, P5, P6, ... Pj are generated in this order, and search points Pj1 and Pj2 are generated in step S1407 as the next trajectory point candidate $P_{next}$. In addition, the trajectory point Pj is a trajectory point candidate $P_{next}$ which is a search point having a minimum cost 1106 among the search points Pi1 to Pi6 generated in step S1406 one step before.

Position information Oj1 to Oj2 of the search points Pj1 to Pj2 are the same as position information of the trajectory point Pj (refer to the above Equation (10)), and the posture information Qi1 to Qi2 of the search points Pj1 to Pj2 which are the next trajectory point candidate $P_{next}$ are the posture information $Q_{next}$ of the above Equation (9). According to the above Equations (4) to (7), the search unit 1202 can calculate a candidate in which only the posture is changed without changing the position of the tip portion 102. By the posture search, not only the posture is changed by the spherical interpolation, but also a posture in which allowance from the position is allowed can be searched.

Returning to FIG. 14, after step S1406 or S1407, the search unit 1202 executes a joint angle calculation process (step S1408). The joint angle calculation process (step S1408) is a process for calculating a joint angle $\theta_{next}$ of the robot arm 101 so as to be the trajectory point candidate $P_{next}$ of the tip portion 102. Details of the joint angle calculation process (step S1408) will be described later with reference to FIG. 17. After the joint angle $\theta_{next}$ is calculated by the joint angle calculation process (step S1408), the process returns to step S1403 by the loop process (step S1402).

<Joint Angle Calculation Process (Step S1408)>

FIG. 17 is a flowchart illustrating a detailed process procedure example of the joint angle calculation process (step S1408) illustrated in FIG. 14. The search unit 1202 executes a loop process for the trajectory point candidate obtained in step S1406 or S1407 (step S1701). Specifically, for example, the search unit 1202 calculates the joint angle $\theta_{next}$ that becomes the trajectory point candidate $P_{next}$ by inverse kinematics (step S1702). Next, the search unit 1202 determines whether the robot arm 101 specified by the trajectory point candidate $P_{next}$ and the joint angle $\theta_{next}$ interferes with the obstacle 104 in the obstacle configuration DB 212 (step S1703).

When there is no interference (step S1703: No), the search unit 1202 adds the joint angle $\theta_{next}$ to the joint angle 1102 in an entry of the trajectory point candidate $P_{next}$ of the hand search data 219, adds the current search point ID 1101 to the previous search point ID 1105, and adds ($\Delta r_{next}$, $\Delta p_{next}$, $\Delta y_{next}$) to the difference posture 1104 (step S1704). Then, the search unit 1202 calculates the cost 1106 ($Cost_{next}$) of the trajectory point candidate $P_{next}$ (step S1705). The cost 1106 of the trajectory point candidate $P_{next}$ is calculated by the following Equation (11).

$$Cost_{next} = Cost_{current} + Distance(P_{current}, P_{next}) \tag{11}$$

Distance (A, B) is a distance function for calculating a Euclidean distance between points A and B. When a plurality of trajectory point candidates $P_{next}$ are obtained in step S1406 by the above Equation (11), a distance between a position of the trajectory point $P_{current}$ and the position of the trajectory point candidate $P_{next}$ is calculated. In addition, the position of the trajectory point $P_{current}$ and the position of the trajectory point candidate $P_{next}$ may be the position of the tip portion 102, and the positions of the tip portion 102 and the joints J1 to Jn, respectively.

In addition, when a plurality of trajectory point candidates $P_{next}$ are obtained in step S1407, a difference between a posture of the trajectory point $P_{current}$ and a posture of the trajectory point candidate $P_{next}$ is calculated as a distance. The posture of the trajectory point $P_{current}$ and the posture of the trajectory point candidate $P_{next}$ may be the posture of the tip portion 102, and the posture of the tip portion 102 and the joints J1 to Jn, respectively.

The shorter the distance between the trajectory point $P_{current}$ and the trajectory point candidate $P_{next}$ is, the smaller the cost 1106 becomes and the easier the trajectory point candidate $P_{next}$ is selected in step S1403. After that, the search unit 1202 updates the searched flag 1107 from False to True (step S1706). Then, the process proceeds to step S1708.

On the other hand, when there is interference in step S1703 (step S1703: Yes), the search unit 1202 deletes the entry of the trajectory point candidate $P_{next}$ from the hand search data 219 (step S1707), and the process proceeds to step S1708. In step S1708, the search unit 1202 returns to step S1702 if there is an unselected trajectory point candidate $P_{next}$, and returns to step S1403 if there is no unselected trajectory point candidate $P_{next}$.

<Smoothing Process (Step S1303)>

FIG. 18 is a flowchart illustrating a detailed process procedure example of the smoothing process (step S1303) by the smoothing unit 1203 illustrated in FIG. 13. The smoothing unit 1203 performs a loop process of steps S1802 to S1812 until the smoothing of each of the trajectory points P1 to Pn in the trajectory data T is completed. That is, in step S1813, if there is an unsmoothed trajectory point P, the process returns to step S1802, and if there is no unsmoothed trajectory point P, the process proceeds to the imparting process (step S1304).

The smoothing unit 1203 obtains a set of smoothable points between unsmoothable points in the trajectory data T (step S1802). The unsmoothable points are trajectory points P in which the smoothing availability 1005 is "FALSE". In an initial state, the trajectory points P in which the smoothing availability 1005 is "FALSE" are the trajectory points P1 and Pn. The smoothable points are trajectory points P in which the smoothing availability 1005 is "TRUE". In the initial state, the trajectory points P in which the smoothing availability 1005 between the unsmoothable points in the trajectory data T is "TRUE" are the trajectory points P2 to Pn−1.

The smoothing unit 1203 performs the loop process of steps S1804 to S1811 for the set of the smoothable points (step S1803). That is, in step S1812, if there is an unacquired set in step S1802, the process returns to step S1804, and if there is no unacquired set, the process returns to step S1802.

The smoothing unit 1203 calculates an interpolation curve on a joint angle space 1900 (step S1804). The joint angle space 1900 is a vector space spanned by joints J1 to Jn and in which the joint angle 1002 of each of the trajectory points exists. Joint angles 1002 of the two unsmoothable points before and after the set of the smoothable points are $\theta_a$ and $\theta_b$, respectively. From values of the joint angles $\theta_a$ and $\theta_b$ and values of joint angles $\theta_{a-1}$ and $\theta_{b+1}$ before and after the joint angles $\theta_a$ and $\theta_b$, an interpolation equation F(t) (also referred to as an interpolation curve) that satisfies the following constraints is calculated.

$$F(0) = \theta_a \tag{12}$$

$$F(1) = \theta_b \tag{13}$$

$$F'(0) = \theta_a - \theta_{a-1} \tag{14}$$

$$F'(1) = \theta_{b+1} - \theta_b \tag{15}$$

$$F''(0) = F''(1) = 0 \tag{16}$$

The above equations (12) to (16) are constraints on an interpolation curve when intervals [$\theta_{a-1}$, $\theta_a$] and [$\theta_b$, $\theta_{b-1}$] are straight lines. A method for obtaining the interpolation curve is an example, and for example, the interpolation curve may correspond to this interval among a cubic spline interpolation curve passing through the joint angle 1002 corresponding to all the unsmoothable trajectory points.

When the interpolation curve is calculated, the smoothing unit 1203 performs the loop process of steps S1806 to S1810 for the number of smoothable points in the set (step S1805). Specifically, for example, the smoothing unit 1203 calculates a smoothed $\theta i'$ for a joint angle $\theta i$ (step S1806). When the joint angle $\theta i$ is $\theta i'$, the smoothing unit 1203 determines whether the robot arm 101 interferes with the obstacle 104 (step S1808).

If there is no interference (step S1808: No), the joint angle $\theta i$ in the trajectory data T is updated to $\theta i'$ (step S1809), and the process proceeds to step S1811. In step S1811, if there is an unselected smoothable point in the set, the smoothing unit 1203 returns to step S1806, and if there is no unselected smoothable point in the set, the process proceeds to step S1812.

On the other hand, if there is interference (step S1808: Yes), the smoothing unit 1203 updates the smoothing availability 1005 of the joint angle $\theta i$ in the trajectory data T to "unsmoothable" (step S1810), and the process proceeds to step S1812. In step S1812, if there is a set of unselected smoothable points, the process proceeds to step S1803 and the smoothing unit 1203 selects the set of unselected smoothable points, and if there is no set of unselected smoothable points, the process proceeds to step S1813.

FIG. 19 is an illustrative diagram illustrating a calculation example of the interpolation curve in step S1804. FIG. 19 shows an example of interpolating an interval [$\theta_a$, $\theta_b$]. $\theta_a$ is a joint angle 1102 of the joint J at a certain trajectory point $P_a$. $\theta_{a-1}$ is a joint angle 1102 of the joint J at a certain trajectory point $P_{a-1}$. The trajectory point $P_{a-1}$ is a trajectory point that appears after the start point P1 and before the trajectory point $P_a$ in terms of time. The trajectory point $P_{a-1}$ may be the start point P1. $\theta_b$ is a joint angle 1102 of the joint J at a certain trajectory point $P_b$. $\theta_{b+1}$ is a joint angle 1102 of the joint J at a certain trajectory point $P_{b+1}$. The trajectory point $P_b$ is a trajectory point that appears after the trajectory point $P_a$ in terms of time. The trajectory point $P_{b+1}$ is a trajectory point that appears after the trajectory point $P_b$ and before the end point Pn in terms of time. The trajectory point $P_{b+1}$ may be the end point Pn. An interpolation curve 1901 exists in the joint angle space 1900. The joint angle space 1900 is a vector space having joints J1 to Jn as coordinate axes.

A solid line of the interval [$\theta_a$, $\theta_b$] is an interpolation target connecting the joint angle $\theta i$ at the trajectory point of the interval [$\theta_a$, $\theta_b$] before the smoothing. An alternate long and short dash line of the interval [$\theta_a$, $\theta_b$] is an interpolation curve 1901 when the joint angle $\theta i$ in the trajectory data T is updated to $\theta i'$. A dotted line of the interval [$\theta_a$, $\theta_b$] is the interpolation curve 1901 calculated in step S1804. In this way, the smoothing unit 1203 obtains an interpolation equation from the front and rear joint angles $\theta_{a-1}$ and $\theta_{b+1}$, and gradually changes the joint angle 1002 toward points on the interpolation equation, thereby realizing the smoothing of the trajectory data T. As a result, the robot arm 101 stably moves the object 103 with the smooth trajectory data T.

<Imparting Process (Step S1304)>

FIG. 20 is a flowchart illustrating a detailed process procedure example of the imparting process (step S1304) by the imparting unit 1204 illustrated in FIG. 13. The imparting unit 1204 obtains the trajectory data T after the smoothing process (step S1303) (step S2001). Next, the imparting unit 1204 imparts a time $\Delta ti$ to all the trajectory points P1 to Pn based on the maximum velocity 317 of each joint J stored in the joint information DB 301, and writes the time $\Delta ti$ to the control time 1006 of the trajectory point data which is the entry of FIG. 10. The time $\Delta ti$ is calculated by the following Equation (17).

[Math. 3]

$$\Delta t_i = \max_{k \in Number\ of\ Joints} \frac{|\theta_{k,i+1} - \theta_{k,i}|}{V\max_k} \quad (17)$$

In the above Equation (17), k indicates a joint number, and i indicates the trajectory point ID 1001. In addition, $V\max_k$ indicates the maximum velocity 317 of the joint Jk.

Next, the imparting unit 1204 performs a loop process of steps S2003 to S2007 until the control time 1006 is no longer updated (step S2003). In step S2008, when the control time 1006 is no longer updated, the process proceeds to step S1305.

Next, the imparting unit 1204 performs the loop process of steps S2005 and S2006 for all the trajectory points P (step S2004). In step S2007, if there is an unselected trajectory point P, the process returns to step S2005, and if there is no unselected trajectory point P, the process proceeds to step S2008.

The imparting unit 1204 determines whether the current control time 1006 satisfies an angular acceleration constraint, a velocity constraint of the tip portion 102, and an acceleration constraint (step S2005). An angular velocity $\theta i'$, an angular acceleration $\theta i''$ of the joint, a velocity vi of the tip portion 102, and an acceleration ai of the tip portion 102 at the trajectory point Pi are calculated by the following Equations (18) to (21), respectively.

[Math. 4] (18) to (21)

$$\dot{\theta}_i = \frac{\theta_{i+1} - \theta_i}{\Delta t_i} \quad (18)$$

$$\ddot{\theta}_i = \frac{\theta_{i+1} + \theta_{i-1} - 2\theta_i}{\Delta t_i^2} \quad (19)$$

$$v_i = J(\theta_i)\dot{\theta}_i \quad (20)$$

$$a_i = \dot{J}(\theta_i)\dot{\theta}_i + J(\theta_i)\ddot{\theta}_i \quad (21)$$

In the above Equations (18) to (21), J indicates a Jacobian matrix. By the above Equations (18) to (21), parameters such as the angular acceleration, the velocity of the tip portion 102, and the acceleration of the tip portion 102 at the current control time 1006 can be calculated. If all the calculated parameters are equal to or less than corresponding upper limit values (the maximum velocity 317, the maximum acceleration 318, the hand maximum velocity 902, and the hand maximum acceleration 903 of the joint J), the imparting unit 1204 determines that the constraints are satisfied (step S2005: Yes), and the process proceeds to step S2007; if all the calculated parameters are not equal to or less than corresponding upper limit values, one constraint is not satisfied, the imparting unit 1204 determines that the constraints are not satisfied (step S2005: No), and the process proceeds to step S2006. In step S2006, the imparting unit 1204 adds the time Δti to the current control time 1006 (step S2006), and the process proceeds to step S2007.

By the imparting process (step S1304), the operation between the trajectory points satisfies the constraints and is within the control time. Therefore, reproducibility of the trajectory plan can be improved.

As described above, by the trajectory plan generation device 100, it is possible to generate trajectory data T that passes through the trajectory point P, smoothly joins the postures of the tip portion 102, and is easy to operate by the robot arm 101. Accordingly, it is possible to stably hold the object 103, reduce shock to the obstacle, and generate the plan of the trajectory data T of the robot arm 101 that operates at a high velocity.

In addition, the trajectory plan generation device 100 according to the above-described embodiment may be configured as in the following (1) to (13).

(1) For example, the trajectory plan generation device 100 executes a first search process (step S1406) for searching for a plurality of position candidates which are movement destinations of the tip portion 102 within a predetermined distance (the maximum movement distance 702 in one step) from a first trajectory point $P_{current}$ indicating positions and postures of the tip portion 102 between the start point P1 and the end point (the target position and posture) Pn, a second search process (step S1407) for searching for a plurality of posture candidates of the tip portion 102 that change within an allowable range (the maximum displacement 804 in one step) by the spherical interpolation based on postures of the tip portion 102 at the start point P1 and the end point Pn, a determination process (step S1403) for determining a second trajectory point $P_{next}$ indicating positions and postures of movement destinations of the tip portion 102 from the first trajectory point $P_{current}$ based on the plurality of position candidates searched by the first search process and the plurality of posture candidates searched by the second search process, and an output process (step S1305) for outputting trajectory data T including the first trajectory point $P_{current}$ and the second trajectory point $P_{next}$ determined by the determination process.

Accordingly, it is possible to make a plan for stabilizing the object 103 held by the tip portion 102.

(2) In addition, in the above (1), the trajectory plan generation device 100 executes a calculation process (step S1705) for calculating a cost related to a distance from the first trajectory point $P_{current}$ for each of the plurality of position candidates, and in the determination process (step S1403), the trajectory plan generation device 100 determines a position of the second trajectory point $P_{next}$ based on a plurality of costs calculated by the calculation process.

Accordingly, it is possible to determine an appropriate position candidate for stabilizing the object 103 held by the tip portion 102 as the position of the second trajectory point $P_{next}$.

(3) In addition, in the above (2), in the determination process (step S1403), the trajectory plan generation device 100 determines a position candidate which is a calculation source of a minimum cost among the plurality of costs as the position of the second trajectory point $P_{next}$.

Accordingly, it is possible to determine a position candidate at which the movement distance of the tip portion 102 is minimum as the position of the second trajectory point $P_{next}$, and it is possible to make the plan for stabilizing the object 103 held by the tip portion 102.

(4) In addition, in the above (1), the trajectory plan generation device 100 executes a calculation process (step S1705) for calculating a cost related to a posture change from the first trajectory point $P_{current}$ for each of the plurality of posture candidates, and in the determination process (step S1403), the trajectory plan generation device 100 determines a posture of the second trajectory point $P_{next}$ based on a plurality of costs calculated by the calculation process.

Accordingly, it is possible to determine an appropriate posture candidate for stabilizing the object 103 held by the tip portion 102 as the posture of the second trajectory point $P_{next}$.

(5) In addition, in the above (4), in the determination process (step S1403), the trajectory plan generation device 100 determines a posture candidate which is a calculation source of a minimum cost among the plurality of costs as the posture of the second trajectory point $P_{next}$.

Accordingly, it is possible to determine a position candidate at which the posture change of the tip portion 102 is minimum as the posture of the second trajectory point $P_{next}$, and it is possible to make the plan for stabilizing the object 103 held by the tip portion 102.

(6) In addition, in the above (1), the trajectory plan generation device 100 executes a calculation process (step S1702) for calculating rotation angles of a plurality of joints J for each of the plurality of position candidates, and a determination process (step S1703) for determining, based on structure data (the obstacle configuration DB 212) of the obstacle 104 disposed in a space in which the robot arm 101 exists, whether the robot arm 101 interferes with the obstacle 104 in each of the plurality of postures of the robot arm 101 based on a calculation result of the calculation process, and in the determination process (step S1403), the trajectory plan generation device 100 determines the second trajectory point $P_{next}$ based on a determination result of the determination process.

Accordingly, it is possible to determine a shape of the robot arm 101 so as not to interfere with the obstacle 104, and it is possible to reduce falling of the object 103 from the tip portion 102 due to the interference with the obstacle 104.

(7) In addition, in the above (1), the trajectory plan generation device 100 executes a smoothing process (step S1303) for smoothing a trajectory between the first trajectory point and the second trajectory point, and in the output process (step S1305), the trajectory plan generation device 100 outputs smoothed trajectory data T obtained by the smoothing process.

Accordingly, even if the robot arm 101 is movable, it is possible to make the plan for stabilizing the object 103 held by the tip portion 102.

(8) In addition, in the above (1), in the smoothing process (step S1303), the trajectory plan generation device 100 generates an interpolation curve 1901 connecting joint angles θa of the plurality of joints J at a third trajectory point after the start point P and before the first trajectory point $P_{current}$ and joint angles θb of the plurality of joints J at a fourth trajectory point after the second trajectory point $P_{next}$ and before the end point Pn based on a predetermined constraint, and updates the joint angles of the plurality of joints J at the first trajectory point $P_{current}$ and the joint angles of the plurality of joints J at the second trajectory point $P_{next}$ so as to approach the interpolation curve 1901 (S1806 and FIG. 19).

It is possible to specify the shape of the robot arm 101 such that a movement track of the tip portion 102 holding the object 103 is stabilized.

(9) In addition, in the above (8), the predetermined constraint is that differences between angular velocities of the plurality of joints at the third trajectory point and angular velocities of the plurality of joints at the fourth trajectory point are within an allowable range (Equations (14) and (15)).

(10) In addition, in the above (8), the predetermined constraint is that differences between angular accelerations of the plurality of joints at the third trajectory point and angular accelerations of the plurality of joints at the fourth trajectory point are within an allowable range (Equation (16)).

Accordingly, it is possible to reduce the falling of the object 103 from the tip portion 102 due to the movement of the robot arm 101.

(11) In addition, in the above (8), in the smoothing process (step S1303), the trajectory plan generation device 100 determines whether the robot arm 101 interferes with the obstacle 104 in a posture of the robot arm 101 by updated joint angles of the plurality of joints at the first trajectory point $P_{current}$ and the updated joint angles of the plurality of joints at the second trajectory point $P_{next}$ based on the structure data (the obstacle configuration DB 212) of the obstacle 104 disposed in the space in which the robot arm 101 exists, and updates the first trajectory point $P_{current}$ and the second trajectory point $P_{next}$ by the updated joint angles of the plurality of joints at the first trajectory point $P_{current}$ and the updated joint angles of the plurality of joints at the second trajectory point $P_{next}$ when it is judged that the robot arm 101 does not interfere with the obstacle 104 (S1809).

Accordingly, it is possible to determine the movement track of the robot arm 101 so as not to interfere with the obstacle 104, and it is possible to reduce falling of the object 103 from the tip portion 102 due to the interference with the obstacle 104.

(12) In addition, in the above (1), the trajectory plan generation device 100 executes an imparting process (step S1304) for imparting, based on a velocity constraint of the joint J, a control time for the robot arm 101 to operate so as to be a trajectory from the first trajectory point $P_{current}$ to the second trajectory point $P_{next}$.

Accordingly, it is possible to confirm an operation time of the robot arm 101 such that the object 103 held by the tip portion 102 is stabilized.

(13) In addition, in the above (12), in the imparting process (step S1304), when the velocity constraint is not satisfied, the trajectory plan generation device 100 imparts an additional time to the trajectory from the first trajectory point $P_{current}$ to the second trajectory point $P_{next}$.

Accordingly, it is possible to impart a time corresponding to motion of the robot arm 101, and it is possible to improve the reproducibility of the operation of the robot arm 101.

The invention is not limited to the above embodiment and includes various modifications and equivalent configurations within the spirit of the claims. For example, the above embodiment has been described in detail for easy understanding of the invention, and the invention is not necessarily limited to those having all the configurations described. A part of a configuration of a certain embodiment may be replaced with a configuration of another embodiment. In addition, the configuration of another embodiment may be added to the configuration of the certain embodiment. Further, a part of the configuration of each embodiment may be added to, deleted from, or replaced with another configuration.

Further, parts or all of the configurations, functions, processing units, processing methods described above and the like may be implemented by a hardware, for example by designing with an integrated circuit, or may be implemented by a software, with the processor 201 to interpret and execute a program that implements each function.

Information such as a program, a table, and a file that implements each function can be stored in a storage device such as a memory, a hard disk, and a solid state drive (SSD), or a recording medium such as an integrated circuit (IC) card, an SD card, and a digital versatile disc (DVD).

Control lines and information lines indicate what is considered necessary for description, and not all the control lines and information lines in the products are illustrated. In fact, it may be considered that almost all the configurations are connected with each other.

The invention claimed is:

1. A trajectory plan generation device configured to generate a trajectory plan in which a tip portion of a robot arm having a plurality of joints moves from a start point to an end point, the trajectory plan generation device comprising:
    a processor configured to execute a program; and
    a storage device configured to store the program, wherein the processor is configured to execute:
        a first search process for searching for a plurality of position candidates which are movement destinations of the tip portion within a predetermined distance from first trajectory information indicating positions and postures of the tip portion between the start point and the end point;
        a second search process for searching for, at the plurality of position candidates, a plurality of posture candidates of the tip portion that change within an allowable range by spherical interpolation based on postures of the tip portion at the start point and the end point;
        a first determination process for determining second trajectory information indicating a position and a posture of a movement destination of the tip portion from the first trajectory information based on the plurality of position candidates searched for by the first search process and the plurality of posture candidates searched for by the second search process, and
        an output process for outputting trajectory data including the first trajectory information and the second trajectory information determined by the determination process.

2. The trajectory plan generation device according to claim 1, wherein
    a calculation process for calculating a cost related to a distance from the first trajectory information is executed for each of the plurality of position candidates, and
    in the first determination process, the processor determines a position of the second trajectory information based on a plurality of costs calculated by the calculation process.

3. The trajectory plan generation device according to claim 2, wherein
    in the first determination process, the processor determines a position candidate which is a calculation source of a minimum cost among the plurality of costs as the position of the second trajectory information.

4. The trajectory plan generation device according to claim 1, wherein
    a calculation process for calculating a cost related to a posture change from the first trajectory information is executed for each of the plurality of posture candidates, and in the first determination process, the processor determines a posture of the second trajectory information based on a plurality of costs calculated by the calculation process.

5. The trajectory plan generation device according to claim 4, wherein
in the first determination process, the processor determines a posture candidate which is a calculation source of a minimum cost among the plurality of costs as the posture of the second trajectory information.

6. The trajectory plan generation device according to claim 1, wherein
a calculation process for calculating rotation angles of the plurality of joints and a second determination process for determining, based on structure data of an obstacle disposed in a space in which the robot arm exists, whether the robot arm interferes with the obstacle in each of a plurality of postures of the robot arm based on a calculation result obtained by the calculation process are executed for each of the plurality of position candidates, and
in the first determination process, the processor determines the second trajectory information based on a determination result obtained by the second determination process.

7. The trajectory plan generation device according to claim 1, wherein
the processor is configured to execute a smoothing process for smoothing a trajectory between the first trajectory information and the second trajectory information, and
in the output process, the processor outputs smoothed trajectory data obtained by the smoothing process.

8. The trajectory plan generation device according to claim 7, wherein
in the smoothing process, the processor generates an interpolation curve connecting joint angles of the plurality of joints in third trajectory information after the start point and before the first trajectory information and joint angles of the plurality of joints in fourth trajectory information after the second trajectory information and before the end point based on a predetermined constraint, and updates joint angles of the plurality of joints in the first trajectory information and joint angles of the plurality of joints in the second trajectory information so as to approach the interpolation curve.

9. The trajectory plan generation device according to claim 8, wherein
the predetermined constraint is that differences between angular velocities of the plurality of joints in the third trajectory information and angular velocities of the plurality of joints in the fourth trajectory information are within an allowable range.

10. The trajectory plan generation device according to claim 8, wherein
the predetermined constraint is that differences between angular accelerations of the plurality of joints in the third trajectory information and angular accelerations of the plurality of joints in the fourth trajectory information are within an allowable range.

11. The trajectory plan generation device according to claim 8, wherein
in the smoothing process, the processor determines whether the robot arm interferes with an obstacle in a posture of the robot arm by updated joint angles of the plurality of joints in the first trajectory information and updated joint angles of the plurality of joints in the second trajectory information based on structure data of the obstacle disposed in a space in which the robot arm exists, and updates the first trajectory information and the second trajectory information by the updated joint angles of the plurality of joints in the first trajectory information and the updated joint angles of the plurality of joints in the second trajectory information when it is judged that the robot arm does not interfere with the obstacle.

12. The trajectory plan generation device according to claim 1, wherein
the processor is configured to execute an imparting process for imparting, based on a velocity constraint of the joint, a control time for the robot arm to operate so as to be a trajectory from the first trajectory information to the second trajectory information.

13. The trajectory plan generation device according to claim 12, wherein
in the imparting process, when the velocity constraint is not satisfied, the processor imparts an additional time to the trajectory from the first trajectory information to the second trajectory information.

14. A trajectory plan generation method executed by a trajectory plan generation device that includes a processor configured to execute a program and a storage device configure to store the program, and is configured to generate a trajectory plan in which a tip portion of a robot arm having a plurality of joints moves from a start point to an end point, the trajectory plan generation method comprising:
the processor executing:
a first search process for searching for a plurality of position candidates which are movement destinations of the tip portion within a predetermined distance from first trajectory information indicating positions and postures of the tip portion between the start point and the end point;
a second search process for searching for, at the plurality of position candidates, a plurality of posture candidates of the tip portion that change within an allowable range by spherical interpolation based on postures of the tip portion at the start point and the end point;
a determination process for determining second trajectory information indicating a position and a posture of a movement destination of the tip portion from the first trajectory information based on the plurality of position candidates searched for by the first search process and the plurality of posture candidates searched for by the second search process; and
an output process for outputting trajectory data including the first trajectory information and the second trajectory information determined by the determination process.

15. A non-transitory computer readable medium storing a trajectory plan generation program causing, when executed by a processor, the processor to execute generation of a trajectory plan in which a tip portion of a robot arm having a plurality of joints moves from a start point to an end point, the trajectory plan generation program comprising code configured to cause the processor to execute:
a first search process for searching for a plurality of position candidates which are movement destinations of the tip portion within a predetermined distance from first trajectory information indicating positions and postures of the tip portion between the start point and the end point;

a second search process for searching for, at the plurality of position candidates, a plurality of posture candidates of the tip portion that change within an allowable range by spherical interpolation based on postures of the tip portion at the start point and the end point;

a determination process for determining second trajectory information indicating a position and a posture of a movement destination of the tip portion from the first trajectory information based on the plurality of position candidates searched for by the first search process and the plurality of posture candidates searched for by the second search process; and an output process for outputting trajectory data including the first trajectory information and the second trajectory information determined by the determination process.

* * * * *